(12) United States Patent
Takenaka

(10) Patent No.: US 10,484,024 B2
(45) Date of Patent: Nov. 19, 2019

(54) TRANSMISSION UNIT

(71) Applicant: Murata Manufacturing Co., Ltd., Kyoto (JP)

(72) Inventor: Kiichiro Takenaka, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

(21) Appl. No.: 16/211,940

(22) Filed: Dec. 6, 2018

(65) Prior Publication Data

US 2019/0181892 A1 Jun. 13, 2019

(30) Foreign Application Priority Data

Dec. 7, 2017 (JP) ................................ 2017-235252
Oct. 18, 2018 (JP) ................................ 2018-196964

(51) Int. Cl.
*H04B 1/04* (2006.01)
*H04W 52/36* (2009.01)
*H04W 52/02* (2009.01)

(52) U.S. Cl.
CPC .......... *H04B 1/04* (2013.01); *H04W 52/0261* (2013.01); *H04W 52/362* (2013.01); *H04B 2001/045* (2013.01)

(58) Field of Classification Search
CPC .. H04B 1/02; H04B 1/0475; H04B 2001/045; H04B 2001/0146; H04B 2001/0408; H04B 2001/1054; H04W 52/06; H04W 52/026; H04W 52/362; H03F 1/0225
See application file for complete search history.

(56) References Cited

U.S. PATENT DOCUMENTS

| | | | |
|---|---|---|---|
| 6,353,359 B1* | 3/2002 | Leizerovich | H04B 1/0475 330/129 |
| 8,095,090 B2* | 1/2012 | Drogi | H03F 1/0205 455/114.3 |
| 9,369,219 B1* | 6/2016 | Goedken | H04B 1/0475 |
| 9,991,913 B1 | 6/2018 | Dinur et al. | |
| 2011/0254622 A1* | 10/2011 | Kunihiro | H03F 1/0227 330/84 |
| 2012/0064849 A1* | 3/2012 | Langer | H04B 1/04 455/127.2 |
| 2016/0373143 A1* | 12/2016 | Ishikawa | H04B 1/0475 |

FOREIGN PATENT DOCUMENTS

WO 2013/133170 A1 9/2013

* cited by examiner

*Primary Examiner* — Thanh C Le
(74) *Attorney, Agent, or Firm* — Pearne & Gordon LLP

(57) ABSTRACT

A transmission unit includes: a power amplification module that amplifies the power of an input signal and outputs an amplified signal; and a power supply module that supplies a power supply voltage to the power amplification module on the basis of a first control signal corresponding to the band width of the input signal. On the basis of the first control signal, the power supply module varies the power supply voltage in accordance with the amplitude level of the input signal in the case where the band width of the input signal is a first band width and varies the power supply voltage in accordance with the average output power of the power amplification module in the case where the band width of the input signal is a second band width that is larger than the first band width.

20 Claims, 15 Drawing Sheets

TRANSMISSION UNIT

This application claims priority from Japanese Patent Application No. 2017-235252 filed on Dec. 7, 2017, and claims priority to Japanese Patent Application No. 2018-196964 filed on Oct. 18, 2018. The content of these applications are incorporated herein by reference in their entireties.

BACKGROUND OF THE DISCLOSURE

1. Field of the Disclosure

The present disclosure relates to a transmission unit.

2. Description of the Related Art

A power amplification module is used in a mobile communication device such as a cellular phone in order to amplify the power of a radio frequency (RF) signal that is to be transmitted to a base station. In recent years, communication standards such as Long Term Evolution (LTE) and LTE-Advanced, which are high-speed data communication standards, have been adopted in cellular phones. The peak-to-average power ratio (PAPR), which is the ratio between the peak power and the average power of an RF signal, is often made large in these communication standards in order to improve the communication speed. When the PAPR is large, a high power supply voltage is required in order to maintain a high degree of linearity, and the power consumption in a power amplification module tends to be large. On the other hand, it is demanded that the power consumption be reduced in cellular phones in order to lengthen the amount of time for which the telephone calls and communication can be performed.

In order to deal with this problem, for example, International Publication No. 2013/133170 discloses a transmission device in which an envelope tracking (ET) method is adopted that improves the power efficiency by controlling the power supply voltage in accordance with the amplitude level of a modulated signal. In a power supply device of this transmission device, a combination of a switching amplification unit and a linear amplification unit is employed, and as a result a power supply voltage is generated that tracks the variations in the amplitude of the modulated signal.

On the other hand, in these communication standards that realize high-speed data communication, the band widths of RF signals are becoming increasingly larger as a result of the modulation methods used. For example, in the fifth generation mobile communication system (5G), a band width exceeding 50 MHz is possible. In the case where a signal having a large band width is amplified by an ET-method transmission device such as that disclosed in International Publication No. 2013/133170, it is necessary to inject a large current into a linear amplification unit in order to suppress the tracking delay of the power supply voltage. Therefore, there is a problem in that the power consumption of the linear amplification unit is increased and consequently the power efficiency of the entire transmission device is reduced.

BRIEF SUMMARY OF THE DISCLOSURE

The present disclosure was made in light of the above-described circumstances and it is an object thereof to provide a transmission unit that improves the power efficiency regardless of the size of the band width.

In order to achieve this object, a transmission unit according to a preferred embodiment of the present disclosure includes: a power amplification module that amplifies the power of an input signal and outputs an amplified signal; and a power supply module that supplies a power supply voltage to the power amplification module on the basis of a first control signal corresponding to a band width of the input signal. On the basis of the first control signal, the power supply module varies the power supply voltage in accordance with an amplitude level of the input signal in a case where a band width of the input signal is a first band width and varies the power supply voltage in accordance with an average output power of the power amplification module in a case where the band width of the input signal is a second band width that is larger than the first band width.

According to the preferred embodiment of the present disclosure, a transmission unit can be provided that can improve the power efficiency regardless of the size of the band width.

Other features, elements, characteristics and advantages of the present disclosure will become more apparent from the following detailed description of preferred embodiments of the present disclosure with reference to the attached drawings.

DETAILED DESCRIPTION OF THE DISCLOSURE

Figure 1:
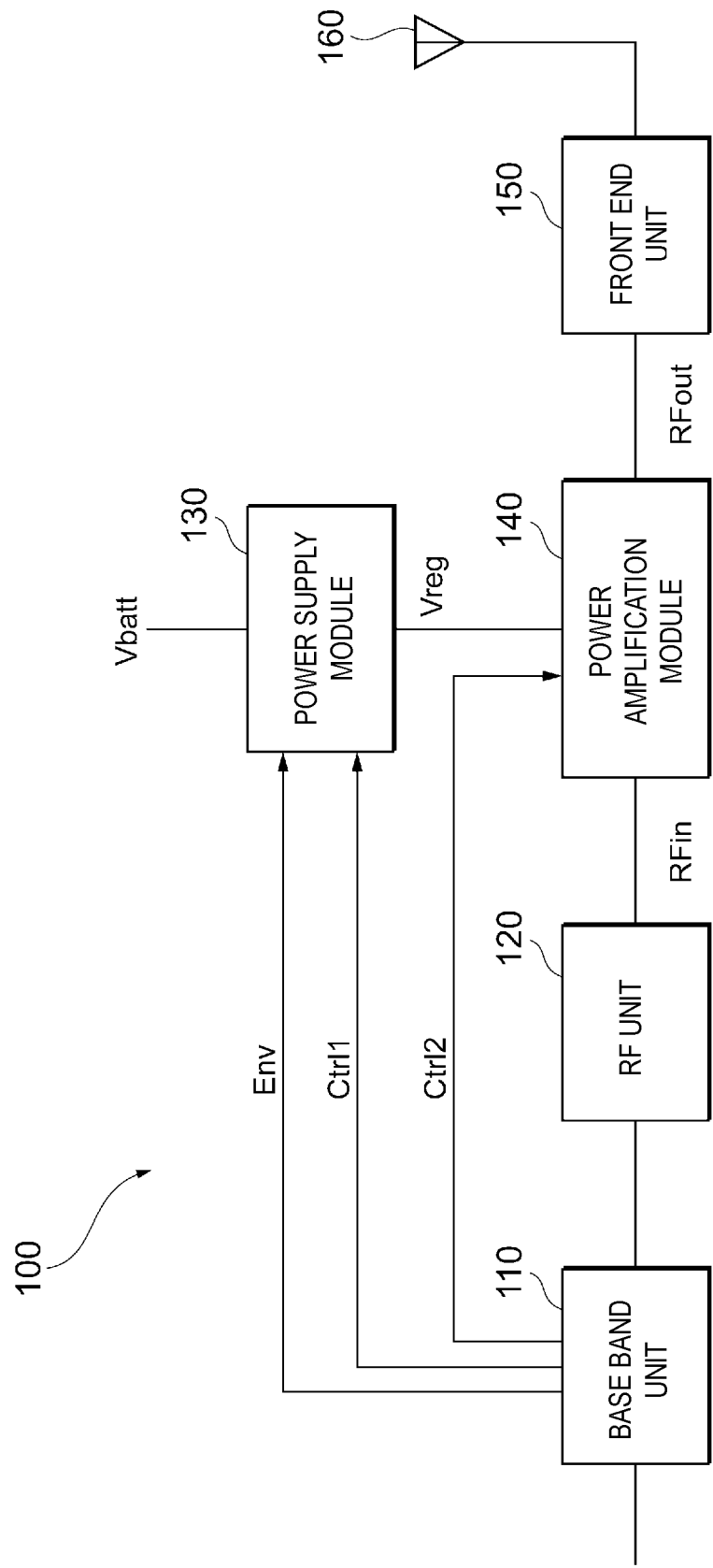
FIG. 1 is a diagram illustrating an example configuration of a transmission unit according to a first embodiment of the present disclosure.

Hereafter, embodiments of the present disclosure will be described in detail while referring to the drawings. In addition, elements that are the same as each other are denoted by the same symbols and repeated description thereof is omitted.

FIG. 1 is a diagram illustrating an example configuration of a transmission unit according to a first embodiment of the present disclosure. The transmission unit 100 illustrated in FIG. 1 is, for example, used in a mobile communication device such as a cellular phone in order to transmit various signals such as speech and data to a base station. The transmission unit 100 generates a transmission signal in accordance with a communication standard such as the second generation mobile communication system (2G), the third generation mobile communication system (3G), the fourth generation mobile communication system (4G), the fifth generation mobile communication system (5G), Long Term Evolution (LTE)-Frequency Division Duplex (FDD), LTE-Time Division Duplex (TDD), LTE-Advanced, and LTE-Advanced Pro. Although a mobile communication device would also be equipped with a reception unit for receiving signals from a base station, the description of such a reception unit is omitted here.

As illustrated in FIG. 1, the transmission unit 100 includes, for example, a base band unit 110, an RF unit 120, a power supply module 130, a power amplification module 140, a front end unit 150, and an antenna 160.

The base band unit 110 modulates an input signal such as speech or data on the basis of a modulation method such as quadrature amplitude modulation (QAM) or orthogonal frequency division multiplexing (OFDM) and outputs a modulated signal. The frequency of the modulated signal is on the order of several MHz to several hundred MHz, for example. In addition, the base band unit 110 supplies a control signal Ctrl1 (first control signal), which is for switching the method used to generate a power supply voltage supplied to the power amplification module 140, to the power supply module 130 and supplies a control signal Ctrl2 (second control signal), which is for switching the method used to amplify the power of an RF signal, to the power amplification module 140. In addition, the base band unit 110 supplies an envelope signal Env, which corresponds to the envelope of the modulated signal, to the power supply module 130. Specific examples of a power supply voltage generation method and specific examples of a power amplification method will be described later. For example, the envelope signal Env may be supplied to the power supply module 130 from the RF unit 120 instead of from the base band unit 110.

The RF unit 120 generates an RF signal RFin, which is for performing wireless transmission, from the modulated signal outputted from the base band unit 110. The frequency of the RF signal RFin is, for example, on the order of several hundred MHz to several tens of GHz, and the RF signal RFin has a band width that differs depending on the communication standard and frequency band used. The control signals Ctrl1 and Ctrl2 outputted from the base band unit 110 are generated in accordance with the band width of the RF signal RFin.

The power supply module 130 generates a voltage Vreg using a power supply voltage generation method in accordance with the control signal Ctrl1 supplied from the base band unit 110 on the basis of a prescribed power supply voltage Vbatt and supplies the generated voltage Vreg to the power amplification module 140. Specifically, in the case where the band width of the RF signal RFin is a comparatively small first band width (for example, around 0-50 MHz, more preferably, around 5-50 MHz), the power supply module 130 operates in accordance with an ET method. In this case, the power supply module 130 outputs a voltage Vreg that varies in accordance with the envelope signal Env (i.e., varies in accordance with the amplitude level of the modulated signal) as a power supply voltage. On the other hand, in the case where the band width of the RF signal RFin is a second band width that is larger than the first band width (for example, greater than or equal to 50 MHz), the power supply module 130 operates in accordance with an average power tracking (APT) method. In this case, the power supply module 130 outputs a voltage Vreg that varies in accordance with the average output power of the power amplification module 140 as a power supply voltage. Thus, the power supply module 130 generates the power supply voltage of the power amplification module 140 using a power supply voltage generation method selected from among the ET method and the APT method in accordance with the band width of the RF signal.

The power amplification module 140 amplifies the power of the RF signal RFin up to the level that is required to transmit the RF signal RFin to a base station on the basis of the control signal Ctrl2 supplied from the base band unit 110 and the voltage Vreg supplied from the power supply module 130 and outputs an amplified signal RFout.

The front end unit 150 performs filtering on the amplified signal RFout and switching on a reception signal received from a base station, for example. The amplified signal outputted from the front end unit 150 is transmitted to the base station via the antenna 160.

Next, specific configurations of the power supply module 130 and the power amplification module 140 will be described while referring to FIG. 2.

Figure 2:
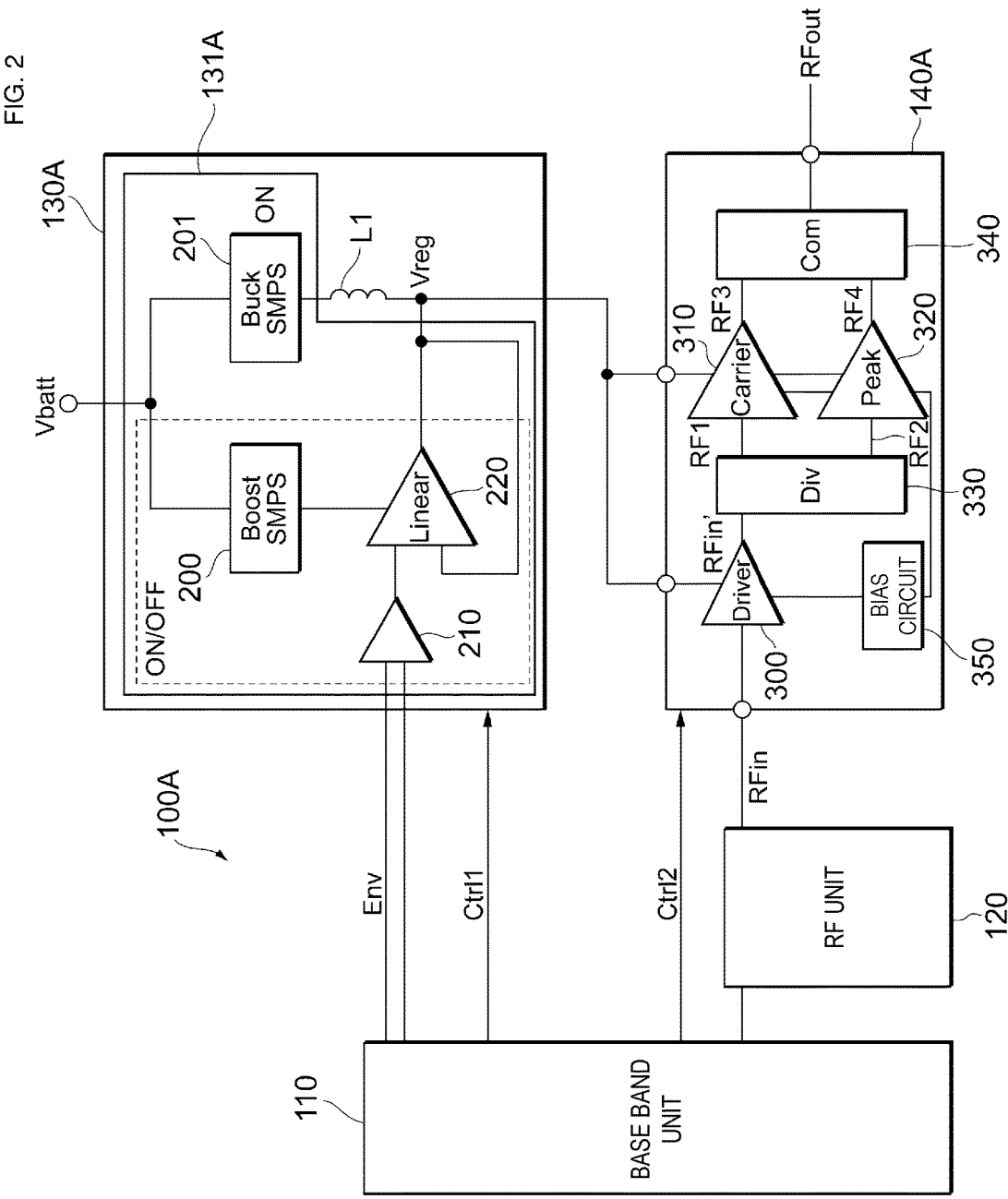
FIG. 2 is a diagram illustrating the circuit configuration of a transmission unit according to the first embodiment of the present disclosure.

FIG. 2 is a diagram illustrating the circuit configuration of a transmission unit 100A according to the first embodiment of the present disclosure. In FIG. 2, the illustration of the front end unit 150 and the antenna 160 is omitted.

A power supply module 130A includes, for example, a boost switching amplifier 200, a buck switching amplifier 201, a differential amplifier 210, a linear amplifier 220, and an inductor L1. The constituent elements other than the inductor L1 are formed on the same power supply IC 131A, for example.

The boost switching amplifier 200 and the buck switching amplifier 201 are switching method voltage converters that generate a voltage by stepping up or stepping down the power supply voltage Vbatt, which has a prescribed level. The boost switching amplifier 200 and the buck switching amplifier 201 are formed of switch-mode power supplies (SMPS), for example. Compared with the linear amplifier 220, which is described later, the boost switching amplifier 200 and the buck switching amplifier 201 have higher power efficiencies but slower responses.

The differential amplifier 210 amplifies the envelope signal Env supplied from the base band unit 110 and outputs the amplified envelope signal Env in the case where the power supply module 130A generates the power supply voltage in accordance with the ET method. In this embodiment, the envelope signal Env is differentially outputted and the differential amplifier 210 amplifies the differential signal and outputs the resulting signal. Alternatively, the envelope signal does not have to be differentially outputted. In this case, the power supply module 130A would not include the differential amplifier 210 and, for example, the envelope signal would be directly supplied to linear amplifier 220.

The linear amplifier 220 has a voltage follower configuration in which an output signal is fed back as an input. Specifically, in the case where the power supply module 130A generates the power supply voltage in accordance with the ET method, a power supply voltage corresponding to the power supply voltage Vbatt is supplied to the linear amplifier 220 from the boost switching amplifier 200 and a signal obtained by amplifying the envelope signal Env is supplied to the linear amplifier 220 from the differential amplifier 210, and the linear amplifier 220 outputs a voltage corresponding to the amplitude of this signal. Thus, a voltage Vreg corresponding to the amplitude level of the modulated signal (i.e., a voltage corresponding to the amplitude level of the RF signal RFin) is outputted from the power supply module 130A. Compared with the boost switching amplifier 200 and the buck switching amplifier 201, the linear amplifier 220 has a faster response but a lower power efficiency. Thus, the power supply module 130A is equipped with the combination of the boost switching amplifier 200, the buck switching amplifier 201, and the linear amplifier 220, which have different characteristics from each other, and consequently the power supply module 130A can generate a voltage Vreg that follows the variations in the amplitude of a modulated signal with low retardation and high efficiency.

The boost switching amplifier 200, the buck switching amplifier 201, the differential amplifier 210, and the linear amplifier 220 are switched between an on state and an off state in accordance with the control signal Ctrl1 supplied from the base band unit 110. Specifically, in the case where the power supply module 130A generates the power supply voltage in accordance with the ET method, the boost switching amplifier 200, the buck switching amplifier 201, the differential amplifier 210, and the linear amplifier 220 are all switched to the on state. Thus, the voltage Vreg is outputted that varies in accordance with the envelope signal Env. On the other hand, in the case where the power supply module 130A generates the power supply voltage in accordance with the APT method, the boost switching amplifier 200, the differential amplifier 210, and the linear amplifier 220 are switched to the off state, and only the buck switching amplifier 201 is switched to the on state (refer to broken line in FIG. 2). In this case, the buck switching amplifier 201 functions as a DC-DC converter and outputs a voltage Vreg that corresponds to the average output power of a power amplification module 140A via the inductor L1.

The on states of the boost switching amplifier 200, the buck switching amplifier 201, the differential amplifier 210, and the linear amplifier 220 may be controlled using a bias voltage or bias current supplied to each amplifier from a bias circuit (not illustrated), for example.

The power amplification module 140A includes, for example, a driver amplifier 300, a carrier amplifier 310, a peak amplifier 320, a divider 330, a combiner 340, and a bias circuit 350.

The driver amplifier 300 amplifies an RF signal RFin supplied from the RF unit 120 and supplies an RF signal RFin' (input signal) to the divider 330. The driver amplifier 300 is not especially restricted, and for example, is formed of a bipolar transistor such as a heterojunction bipolar transistor (HBT) or a field effect transistor such as a metal-oxide-semiconductor field-effect transistor (MOSFET). The same is true for the carrier amplifier 310 and the peak amplifier 320.

The carrier amplifier 310, the peak amplifier 320, the divider 330, and the combiner 340 form a so-called Doherty amplifier that further amplifies the RF signal RFin'.

The divider 330 divides the RF signal RFin' into an RF signal RF1 that is supplied to the carrier amplifier 310 (first signal) and an RF signal RF2 (second signal) that is supplied to the peak amplifier 320. The divider 330 is formed of an inductor, a resistance element, and a capacitor, for example. The RF signals RF1 and RF2 outputted from the divider 330 are generated by dividing the RF signal RFin' such that the RF signals RF1 and RF2 have a phase difference of around 90°, for example.

The carrier amplifier 310 amplifies the RF signal RF1 (first signal) inputted thereto and outputs an RF signal RF3 (third signal). The peak amplifier 320 amplifies the RF signal RF2 (second signal) inputted thereto and outputs an RF signal RF4 (fourth signal). In the case where the carrier amplifier 310 and the peak amplifier 320 function as a so-called Doherty amplifier (hereafter, also referred to as "Doherty operation"), the carrier amplifier 310 operates regardless of the power level of the RF signal RFin'. On the other hand, the peak amplifier 320 operates in a region where the power level of the RF signal RFin' is less than or equal to the maximum level and greater than or equal to a value (back off point) that is a prescribed level lower than the maximum level. Thus, in a region where the power level of the RF signal RFin' is comparatively low (region lower than back off point), only the carrier amplifier 310 operates. In addition, in a region where the power level of the RF signal RFin' is comparatively high (region greater than or equal to back off point), both the carrier amplifier 310 and the peak amplifier 320 operate. Thus, the Doherty amplifier has a configuration that includes the carrier amplifier 310, which operates close to saturation output power in the region where the power level of the RF signal RFin' is comparatively high, and therefore the power efficiency is improved compared with a configuration employing just one amplifier.

The combiner 340 combines the RF signal RF3 outputted from the carrier amplifier 310 and the RF signal RF4 outputted from the peak amplifier 320 and outputs an amplified signal RFout. The combiner 340 also has an impedance matching function of transforming one or both of the output impedance of the carrier amplifier 310 and the output impedance of the peak amplifier 320 while transforming the phases of the RF signal RF3 and the RF signal RF4. For example, in the case where the phase difference between the RF signal RF1 and the RF signal RF2 is around 90°, the combiner 340 transforms the phases of the RF signal RF3 and the RF signal RF4 such that the phase difference between the RF signal RF3 and the RF signal RF4 becomes around 0°.

The bias circuit 350 supplies bias currents or bias voltages to the driver amplifier 300, the carrier amplifier 310, and the peak amplifier 320. The bias circuit 350 adjusts the bias currents or bias voltages on the basis of the control signal Ctrl2, and thereby controls the on states or off states and the operation points of the driver amplifier 300, the carrier amplifier 310, and the peak amplifier 320. In other words, the control signal Ctrl2 is a signal used to control bias currents or bias voltages generated by the bias circuit 350. In addition, the bias circuit 350 may control the gains of the driver amplifier 300, the carrier amplifier 310, and the peak amplifier 320 by adjusting the bias currents or bias voltages.

The voltage Vreg is supplied from the power supply module 130A as a power supply voltage to the driver amplifier 300, the carrier amplifier 310, and the peak amplifier 320.

The power amplification module 140A operates in accordance with a different amplification method depending on the band width of the RF signal. Specifically, in the case where the band width of the RF signal is comparatively small and the power supply module 130A generates a power supply voltage in accordance with the ET method, the power amplification module 140A performs a normal amplification operation rather than a Doherty operation. In this case, the bias circuit 350 adjusts the bias currents or bias voltages such that the carrier amplifier 310 and the peak amplifier 320 operate at identical operation points, for example. Consequently, the carrier amplifier 310 and the peak amplifier 320 are both in the on state regardless of the power level of the RF signal RFin'. In addition, the carrier amplifier 310 and the peak amplifier 320 may be biased so as to both perform class-A operation or class-AB operation, and the amplification operation performed at such a time will be referred to as a "normal amplification operation" so as to be distinguished from the Doherty operation.

On the other hand, in the case where the band width of the RF signal is comparatively large and the power supply module 130A generates the power supply voltage in accordance with the APT method, the power amplification module 140A performs a Doherty operation. In this case, the bias circuit 350 adjusts the bias currents or bias voltages such that the carrier amplifier 310 performs class-A operation or class-AB operation and the peak amplifier 320 performs class-C operation. Thus, the power efficiency can be improved compared with the case where the carrier amplifier 310 and the peak amplifier 320 both perform class-A operation or class-AB operation.

Figure 3:
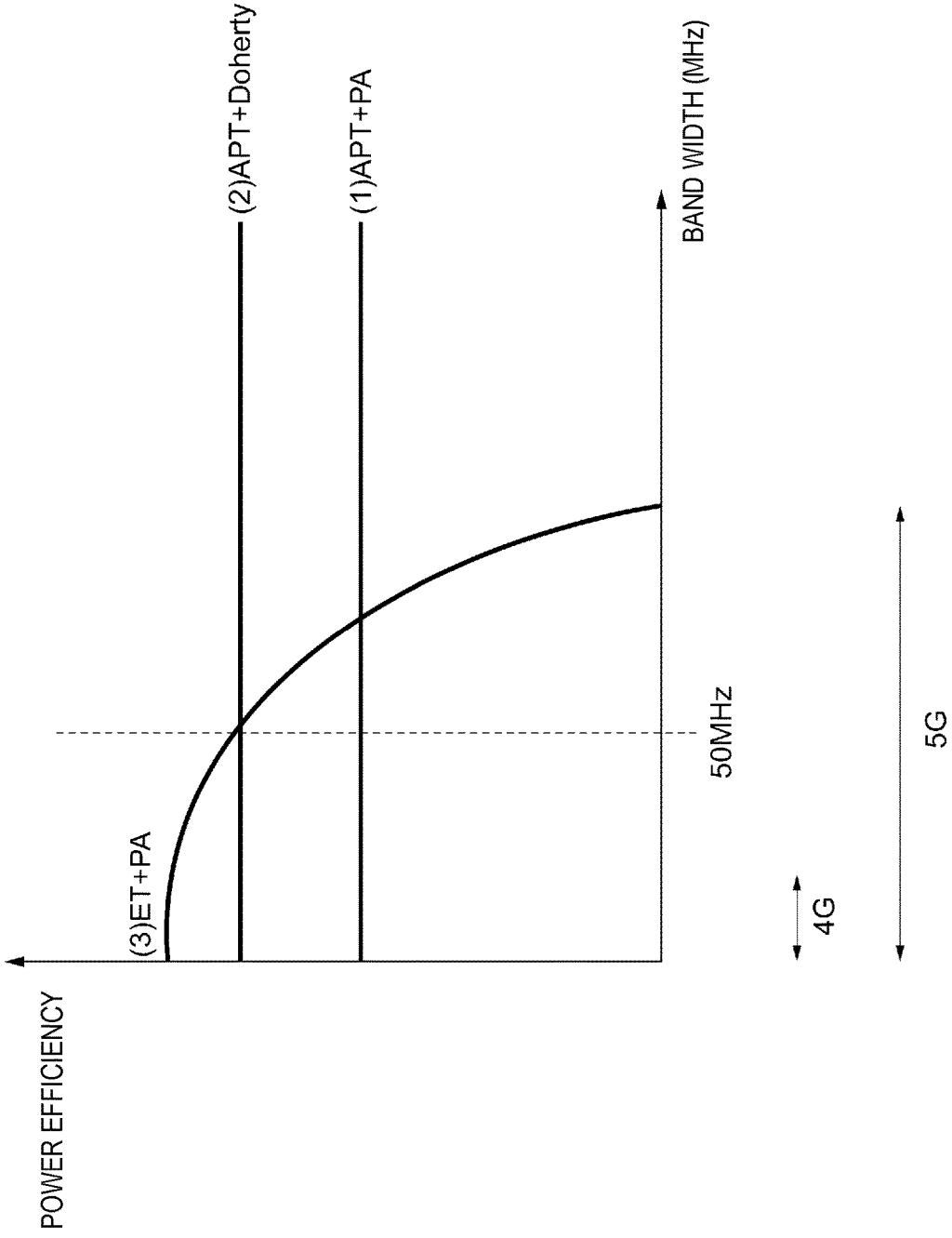
FIG. 3 is a conceptual drawing illustrating the relationship between the band width and the power efficiency for when the transmission unit according to the first embodiment of the present disclosure operates in accordance with various methods.

Next, the effects obtained by switching the power supply voltage generation method and power amplification method in the transmission unit 100A will be described while referring to FIG. 3. FIG. 3 is a conceptual drawing illustrating the relationship between the band width and the power efficiency for when the transmission unit 100A according to the first embodiment of the present disclosure operates in accordance with the various methods. The various combinations of the power supply voltage generation method and the power amplification method illustrated in the figure are listed in Table 1 below. In the graph illustrated in FIG. 3, the horizontal axis represents the band width (MHz) of an RF signal and the vertical axis represents power efficiency.

TABLE 1

| | | POWER SUPPLY VOLTAGE GENERATION METHOD | |
|---|---|---|---|
| | | APT | ET |
| POWER AMPLIFICATION METHOD | NORMAL AMPLIFICATION OPERATION | (1) | (3) |
| | DOHERTY OPERATION | (2) | — |

As illustrated by (1) in FIG. 3, in the case of the combination of the APT method and normal amplification operation, the power efficiency is constant regardless of the band width. In contrast, as illustrated by (2) in FIG. 3, in the case of the combination of the APT method and the Doherty operation, the power efficiency is improved compared with the normal amplification operation. This is because, as described above, in the Doherty operation, the carrier amplifier 310 operates in a state close to saturation as the output power increases.

On the other hand, as illustrated by (3) in FIG. 3, in the case of the combination of the ET method and normal amplification operation, the power efficiency is higher than in the case of the Doherty operation illustrated by (2) in the region where the band width is comparatively small (for example, around 0-50 MHz). This is because the voltage Vreg is dynamically adjusted in accordance with the amplitude level of the modulated signal in the ET method. However, in the ET method, in order to suppress the retardation of the linear amplifier 220 that occurs as the band width increases, the amount of the current that has to be supplied to the linear amplifier 220 increases. Therefore, the current consumption of the linear amplifier 220 increases, and consequently, the power efficiency of the entire transmission unit is reduced. For example, in the region greater than or equal to 50 MHz, as illustrated in FIG. 3, the combination of the ET method and normal amplification operation has lower the power efficiency compared with the combination of the APT method and Doherty operation.

Here, in communication standards such as 3G, 4G, or LTE, which are the current communication standards, in the case where the band width of the RF signal lies within a range of around 1.4-20 MHz, high efficiency can be obtained using the ET method. However, a band width of around 5-100 MHz is possible for RF signals in new communications standards such as 5G. Therefore, in such new communication standards, although there is no problem in the case of frequency bands having a small band width, there is a problem in the case of frequency bands having a large band width in that the power efficiency may be degraded in the ET method.

In order to deal with this problem, in this embodiment, the ET method and the APT method can be made to function as appropriate by switching the power supply voltage generation method in accordance with the band width of the RF signal. In other words, in the transmission unit 100A, the power supply module 130A is controlled so as to operate in accordance with the ET method in the case of a small band width and so as to operate in accordance with the APT method in the case of a large band width. Thus, for example, compared with a configuration in which the power supply module 130A always operates in accordance with the ET method, the power efficiency can be improved regardless of the size of the band width.

In addition, in the transmission unit 100A, the power amplification module 140A is controlled so as to perform the normal amplification operation in the case where the band width is small and to perform the Doherty operation in the case where the band width is large. Thus, compared with a configuration where the normal amplification operation is performed regardless of the size of the band width, the power efficiency can be further improved. Furthermore, for example, the power supply voltage generation method and the power amplification method may be switched at a point where the power efficiency for the combination of the ET method and the normal amplification operation and the power efficiency for the combination of the APT method and the Doherty operation intersect (around 50 MHz in FIG. 3).

In addition, in the transmission unit 100A, the power amplification module 140A is used for both the normal amplification operation and the Doherty operation. Thus, the power efficiency can be improved while suppressing an increase in circuit area compared with a configuration equipped with different power amplification modules for the respective power amplification methods, for example.

In addition, although a configuration is illustrated in FIG. 2 in which the power amplification module 140A includes a first-stage amplifier (driver amplifier 300) and second-stage amplifiers (carrier amplifier 310 and peak amplifier 320), the power amplification module does not have to include a first-stage amplifier. Alternatively, the power amplification module may include three or more amplifiers.

Furthermore, the power supply voltage supplied to the driver amplifier 300 may be a prescribed voltage instead of the voltage Vreg.

Figure 4:
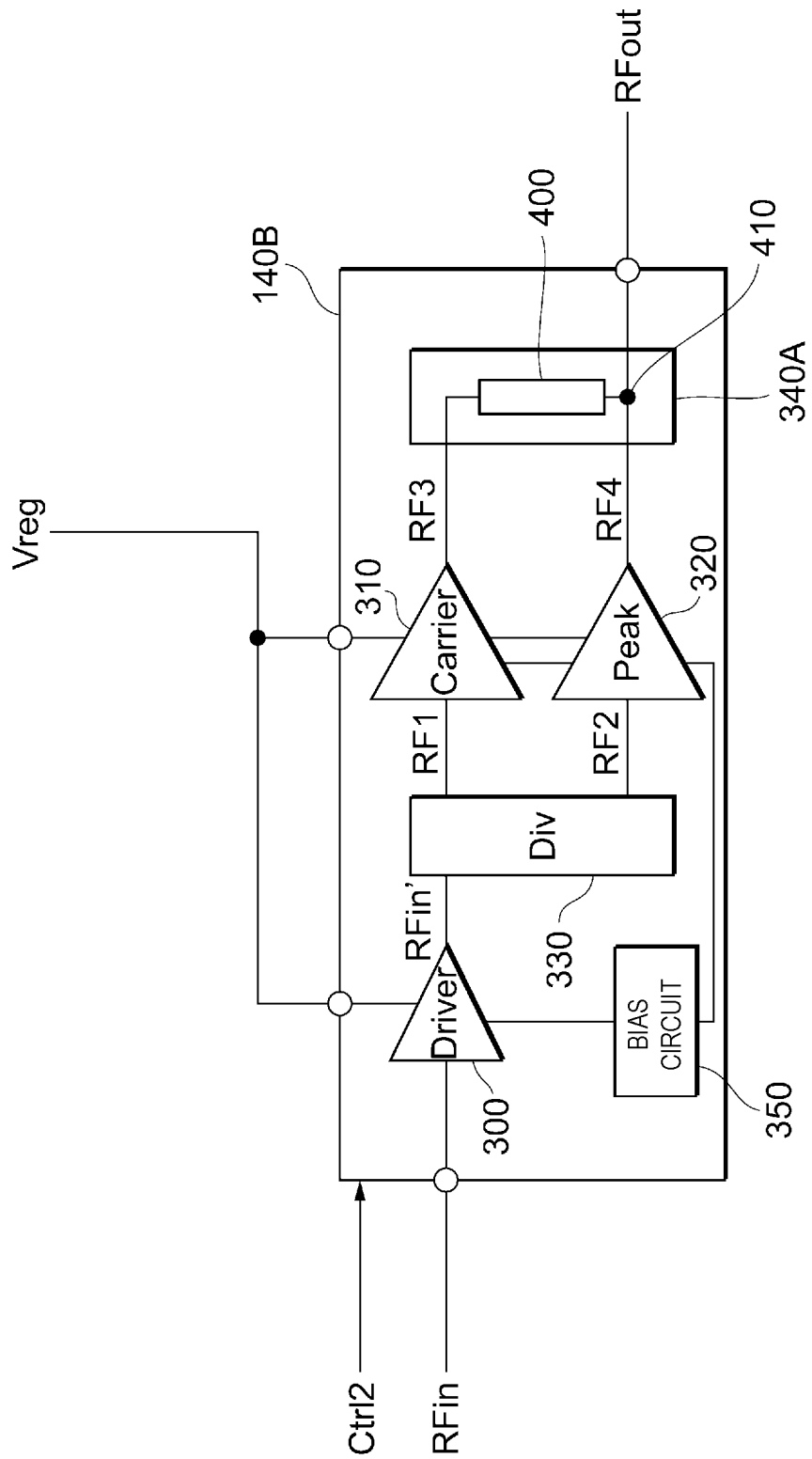
FIG. 4 illustrates an example configuration of a power amplification module.
Figure 5:
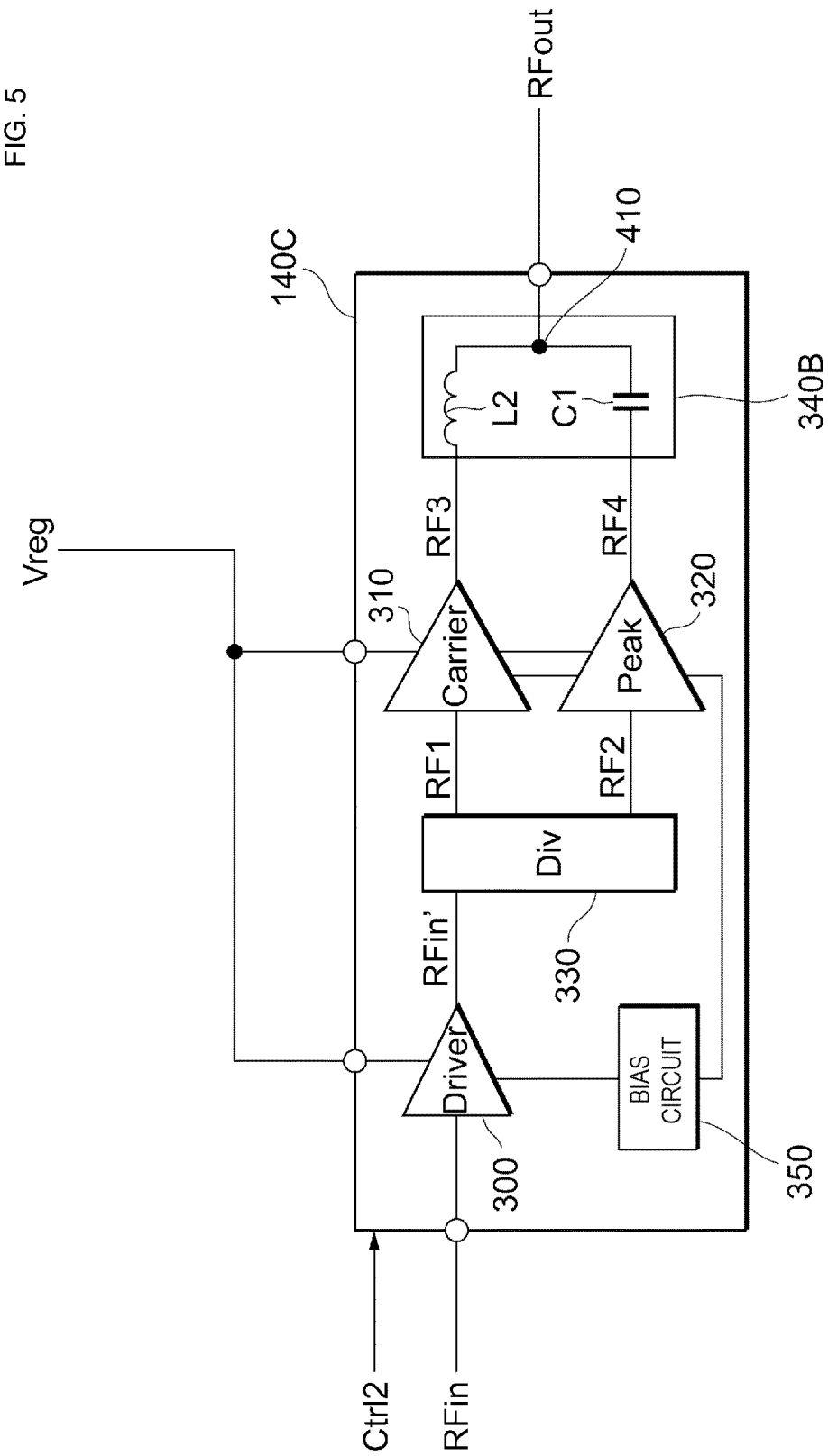
FIG. 5 illustrates an example configuration of the power amplification module.

FIGS. 4 and 5 illustrate example configurations of the power amplification module 140. In this and subsequent embodiments, the description of matters common to the above-described embodiment will be omitted and only the differences will be described. In particular, the same operational effects realized by the same configurations will not be successively described in each embodiment.

A power amplification module 140B illustrated in FIG. 4 and a power amplification module 140C illustrated in FIG. 5 illustrate specific example configurations of the combiner 340 illustrated in FIG. 2.

In the power amplification module 140B, a combiner 340A includes a ¼ wavelength line 400 and a combining part 410.

The ¼ wavelength line 400 is serially connected between the output of the carrier amplifier 310 and the combining part 410. The combining part 410 combines the RF signal RF3, which has passed along the ¼ wavelength line 400, and the RF signal RF4. The ¼ wavelength line 400 retards the phase of the RF signal RF3 outputted from the carrier amplifier 310 by around 90°. As a result, in the case where the phase of the RF signal RF1 is advanced by around 90° from the phase of the RF signal RF2 in the divider 330, the phase difference between the RF signal RF3 and the RF signal RF4 becomes around 0° and the signals are combined with each other in the combining part 410.

In the power amplification module 140C, a combiner 340B includes a combining part 410, an inductor L2, and a capacitor C1.

The inductor L2 is serially connected between the output of the carrier amplifier 310 and the combining part 410. The capacitor C1 (first capacitor) is serially connected between the output of the peak amplifier 320 and the combining part 410. The inductor L2 and the capacitor C1 function as phase shifters that transform the phases of the RF signals RF3 and RF4. For example, the inductor L2 retards the phase of the RF signal RF3 outputted from the carrier amplifier 310 by around 45°. On the other hand, the capacitor C1 advances the phase of the RF signal RF4 outputted from the peak amplifier 320 by around 45°. As a result, in the case where the phase of the RF signal RF1 is advanced by around 45° and the phase of the RF signal RF2 is retarded by around 45° in the divider 330, the phase difference between the RF signal RF3 and the RF signal RF4 becomes around 0° and the signals are combined with each other in the combining part 410.

The configurations of the power amplification modules 140B and 140C may be applied to the power amplification module 140 illustrated in FIG. 1. In contrast to the power amplification module 140B, the power amplification module 140C does not include the ¼ wavelength line 400, and therefore the circuit area can be made smaller.

In addition, in the case where the power amplification modules 140A to 140C perform the normal amplification operation, the peak amplifier 320 may be controlled so as to operate at the same operation point as the carrier amplifier 310 as described above or may be controlled so as to be in the off state. In the case where the peak amplifier 320 is controlled so as to be in the off state, only the carrier amplifier 310 performs an operation of amplifying the RF signal RF1.

Here, at the time of the normal amplification operation, in the case where the peak amplifier 320 is controlled so as to operate at the same operation point as the carrier amplifier 310, the saturation output power at the time of the normal amplification operation in the power amplification modules 140A to 140C and the saturation output power at the time of Doherty operation are equal to each other. Therefore, the voltage Vreg outputted by the power supply module 130A is preferably controlled such that the maximum output voltage in the ET method is equal to the output voltage in the APT method.

On the other hand, in the power amplification module 140B, in the case where the peak amplifier 320 is controlled so as to be in the off state at the time of the normal amplification operation, the saturation output power at the time of the normal amplification operation falls by 6 dB compared with the saturation output power at the time of the Doherty operation. Therefore, in order to obtain identical saturation output powers at the time of the normal amplification operation and at the time of the Doherty operation, the voltage Vreg outputted by the power supply module 130A is preferably controlled such that the maximum output voltage in the ET method is equal to twice the output voltage in the APT method.

In addition, in the power amplification module 140C, in the case where the peak amplifier 320 is controlled so as to be in the off state at the time of the normal amplification operation, the saturation output power at the time of the normal amplification operation falls by 3 dB compared with the saturation output power at the time of the Doherty operation. Therefore, in order to obtain identical saturation output powers at the time of the normal amplification operation and at the time of the Doherty operation, the voltage Vreg outputted by the power supply module 130A is preferably controlled such that the maximum output voltage in the ET method is equal to the square root of twice the output voltage in the APT method.

Figure 6:
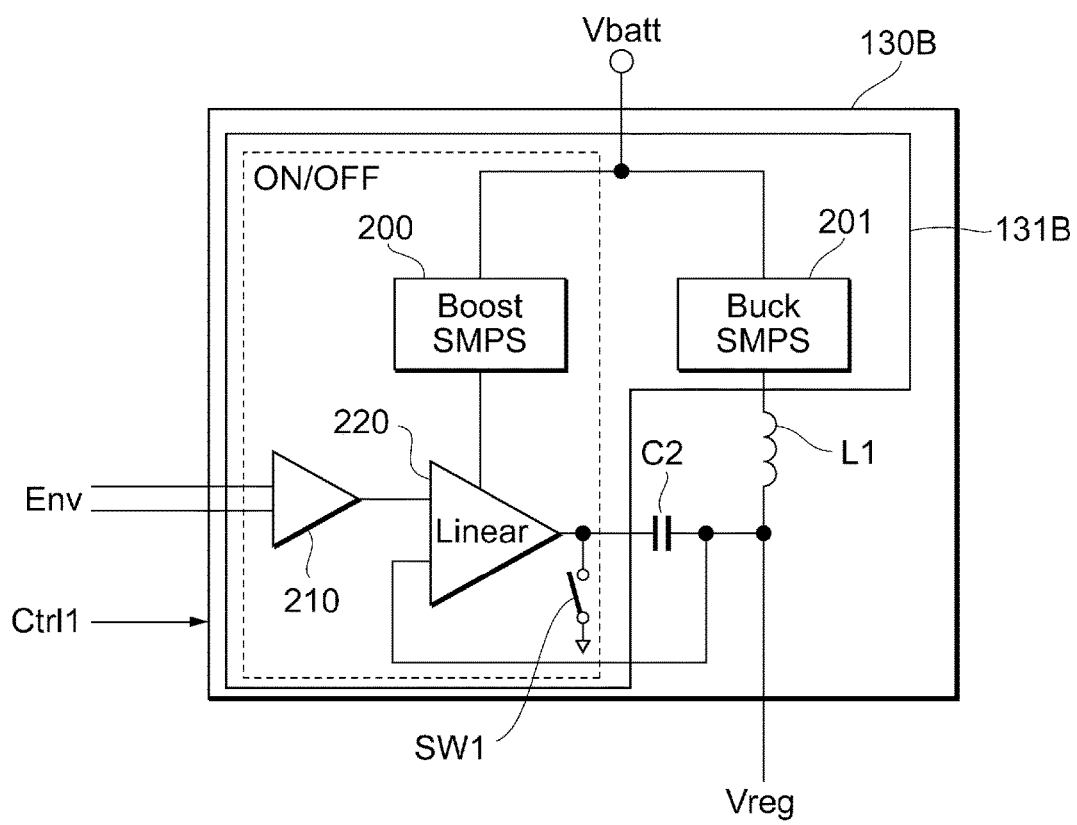
FIG. 6 is a diagram illustrating an example configuration of a power supply module.

FIG. 6 illustrates an example configuration of the power supply module 130. Compared with the power supply module 130A illustrated in FIG. 2, the power supply module 130B illustrated in FIG. 6 further includes a capacitor C2 and a switch circuit SW1. The constituent elements other than the inductor L1 and the capacitor C2 are formed on the same power supply IC 131B, for example.

One end of the capacitor C2 (second capacitor) is connected to the output of the buck switching amplifier 201 via the inductor L1 and the other end of the capacitor C2 is connected to the output of the linear amplifier 220. The capacitance of the capacitor C2 is on the order of 1-10 µF, for example.

The switch circuit SW1 is provided between a connection point between the linear amplifier 220 and the capacitor C2, and the ground. The switch circuit SW1 is provided in order to switch the function of the capacitor C2 in accordance with the power supply voltage generation method. Specifically, in the case where the power supply module 130B generates a power supply voltage in accordance with the ET method, the switch circuit SW1 is turned off (refer to FIG. 6). At this time, the capacitor C2 has a coupling function of blocking a direct-current component included in the output voltage of the linear amplifier 220 and allowing an alternating-current component included in the output voltage of the linear amplifier 220 to pass. On the other hand, in the case where the power supply module 130B generates the power supply voltage in accordance with the APT method, the switch circuit SW1 is turned on and the other end of the capacitor C2 is connected to ground. At this time, the capacitor C2 has a decoupling function of allowing an alternating-current component of a path that extends from the power supply module 130B to the power amplification module 140 to escape to ground (for example, switching noise generated by the buck switching amplifier 201).

The configuration of the power supply module 130B may be applied to the power supply module 130 illustrated in FIG. 1. With this configuration, both a coupling function and a decoupling function can be realized by one capacitor C2.

Next, embodiments will be described for a case where the power supply voltage generation methods include a discrete level ET method, as a modification of the ET method, in addition to the APT method and the ET method described above.

Figure 7:
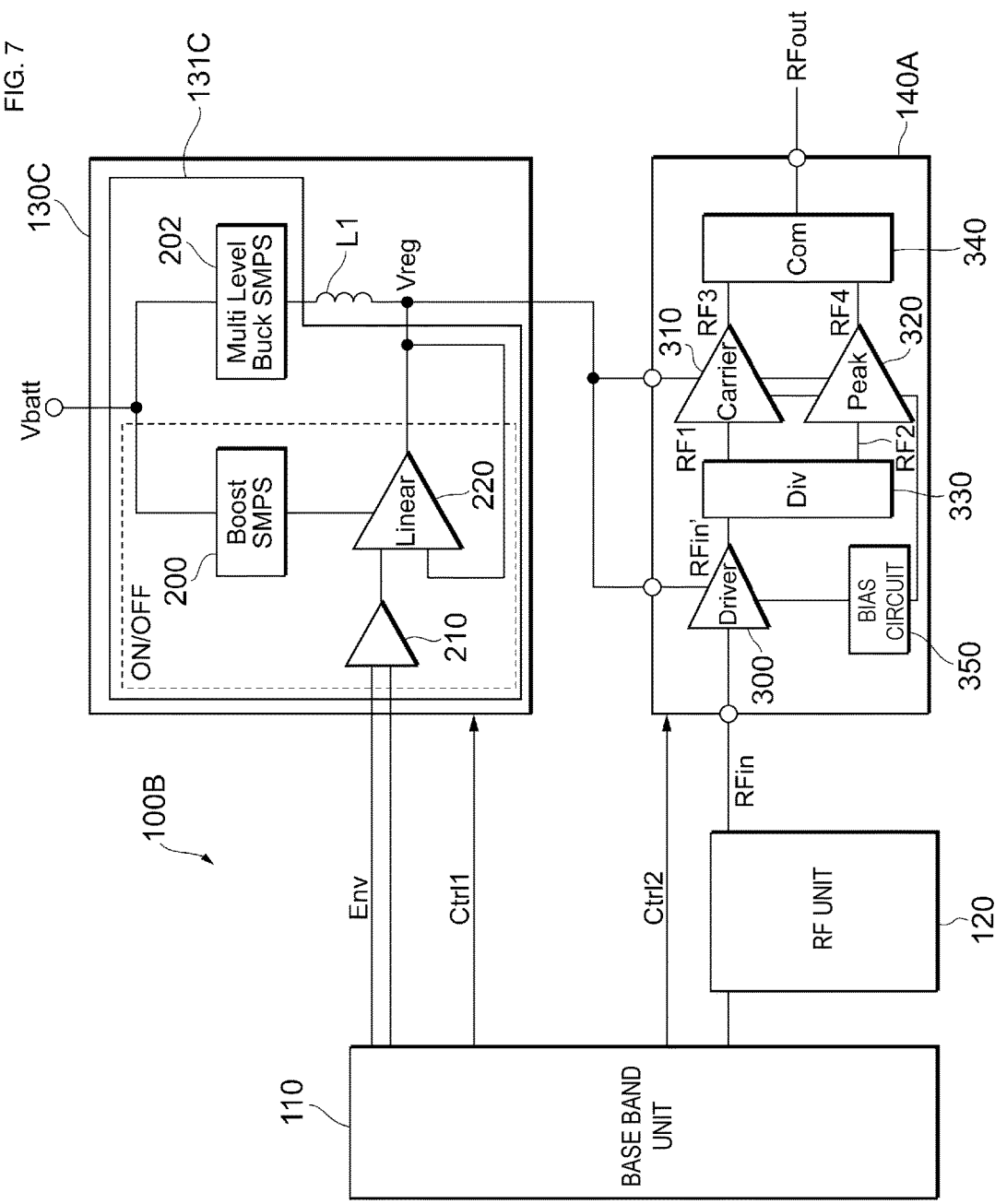
FIG. 7 is a diagram illustrating the circuit configuration of a transmission unit according to a second embodiment of the present disclosure.

FIG. 7 is a diagram illustrating the circuit configuration of a transmission unit 100B according to a second embodiment of the present disclosure.

As illustrated in FIG. 7, compared with the transmission unit 100A, the transmission unit 100B includes a power supply module 130C instead of the power supply module 130A. Compared with the power supply module 130A, the power supply module 130C includes a multilevel buck switching amplifier 202 instead of the buck switching amplifier 201.

The multilevel buck switching amplifier 202 steps up or steps down the power supply voltage Vbatt, which has a prescribed level, and outputs a voltage Vreg that varies discretely in conjunction with the variations in the amplitude level of the RF signal RFin.

Figure 8:
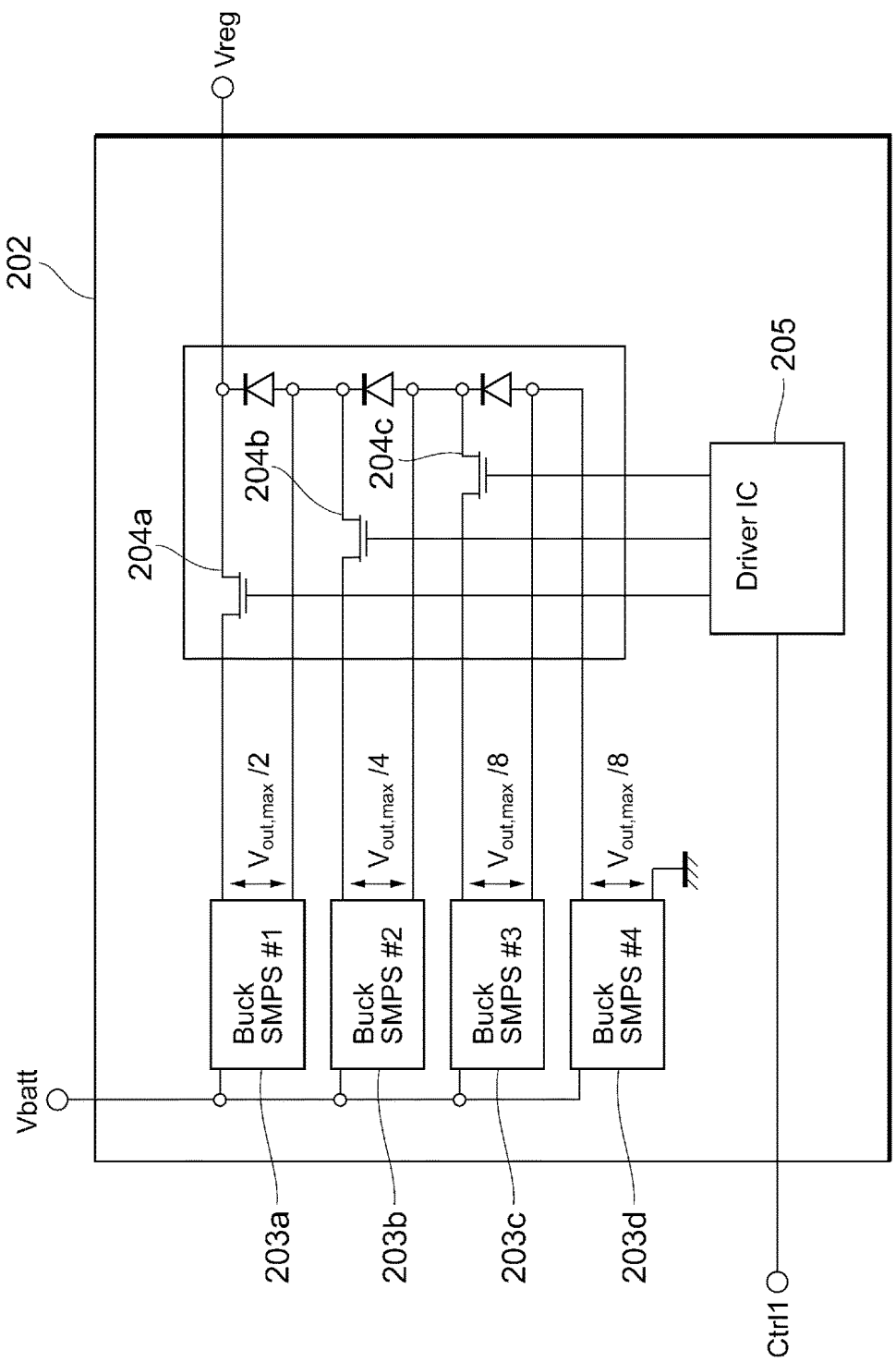
FIG. 8 is a diagram illustrating an example configuration of a multilevel buck switching amplifier.

FIG. 8 is a diagram illustrating an example configuration of the multilevel buck switching amplifier 202. As illustrated in the figure, the multilevel buck switching amplifier 202 includes, for example, four buck switching amplifiers 203a to 203d, three switches 204a to 204c, and a driver IC 205 that switches the three switches 204a to 204c on and off in accordance with a supplied control signal Ctrl1 (first control signal).

The four buck switching amplifiers 203a to 203d respectively output voltages that are ½, ¼, ⅛, and ⅛ of the maximum output voltage of the multilevel buck switching amplifier 202. A voltage Vreg that discretely varies is generated by changing the combination of voltages added together out of the voltages respectively outputted by the four buck switching amplifiers 203a to 203d. The multilevel buck switching amplifier 202 can also output a constant voltage by maintaining the on and off states of the three switches 204a to 204c constant. The number of buck switching amplifiers 203a to 203d and the number of switches 204a to 204c are merely examples, and the configuration is not limited to these examples.

As described above, the power supply module 130C according to this embodiment can output a power supply voltage that continuously varies in conjunction with variations in the amplitude level of the RF signal, a power supply voltage that discretely varies in conjunction with variations in the amplitude level of the RF signal, and a power supply voltage that varies in accordance with the average output power of the power amplification module 140A. Hereafter, a method in which the power supply voltage is a voltage that discretely varies in conjunction with variations in the amplitude level of the RF signal will also be referred to as a discrete level ET method.

Figure 9:
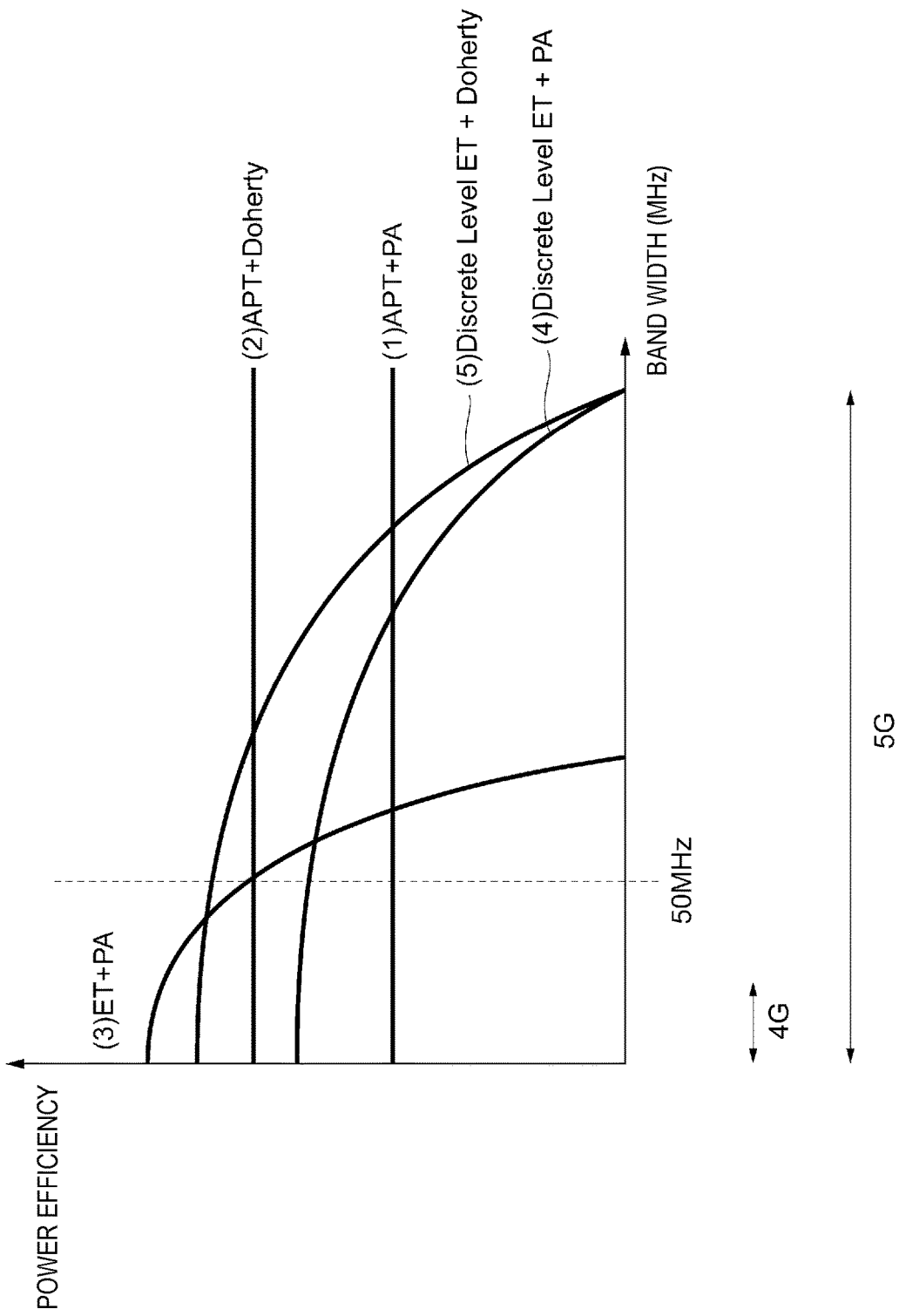
FIG. 9 is a conceptual drawing illustrating the relationship between the band width and the power efficiency for when the transmission unit according to the second embodiment of the present disclosure operates in accordance with various methods.

FIG. 9 is a conceptual drawing illustrating the relationship between the band width and the power efficiency for when the transmission unit 100B according to the second embodiment of the present disclosure operates in accordance with the various methods. The various combinations of the power supply voltage generation method and the power amplification method illustrated in the figure are listed in Table 2 below. In the graph illustrated in the figure, the horizontal axis represents the band width (MHz) of an RF signal and the vertical axis represents power efficiency.

TABLE 2

| | | POWER SUPPLY VOLTAGE GENERATION METHOD | | |
|---|---|---|---|---|
| | | APT | ET | DISCRETE LEVEL ET |
| POWER AMPLIFICATION METHOD | NORMAL AMPLIFICATION OPERATION | (1) | (3) | (4) |
| | DOHERTY OPERATION | (2) | — | (5) |

As illustrated by (4) in FIG. 9, in the case of the combination of the discrete level ET method and the normal amplification operation, the power efficiency in the region in which the band width is comparatively small is inferior to the combination illustrated by (3) in FIG. 9, but is better than the combination illustrated by (1) in FIG. 9. However, in the region where the band width is comparatively large, the combination of the discrete level ET method and the normal amplification operation has inferior efficiency compared with the combination illustrated by (1) in FIG. 9.

Furthermore, the combination of the discrete level ET method and the Doherty operation illustrated by (5) in FIG. 9 has superior efficiency to the combination illustrated by (4) in FIG. 9 for all band widths. Therefore, as will be described later, the power can be amplified with high efficiency regardless of the band width by appropriately selecting the combination of the power supply voltage generation method and the power amplification method for which the efficiency is high in accordance with the band width.

Before describing the combination patterns of methods that realize high efficiency, the reason why the combination of the ET method and the Doherty operation is not illustrated in FIG. 9 but the combination of the discrete level ET method and the Doherty operation is illustrated in FIG. 9 will be described while referring to FIGS. 10A and 10B.

Figure 10A:
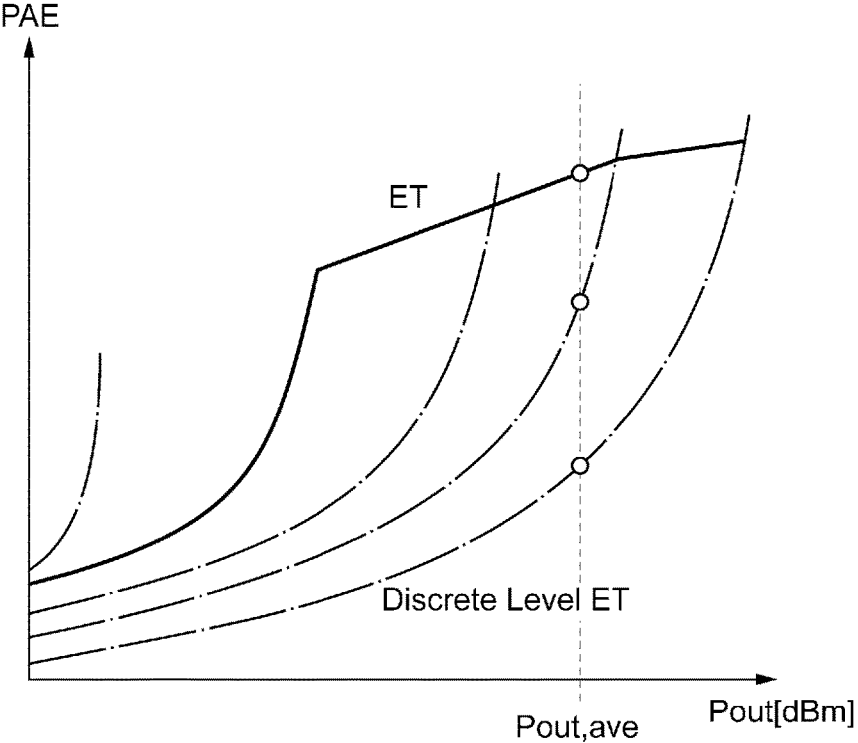
FIG. 10A is a conceptual drawing illustrating the relationship between the output power and the power efficiency for a case where the power supply voltage generation method is an ET method or a discrete level ET method and the power amplification method is a normal amplification operation.
Figure 10B:
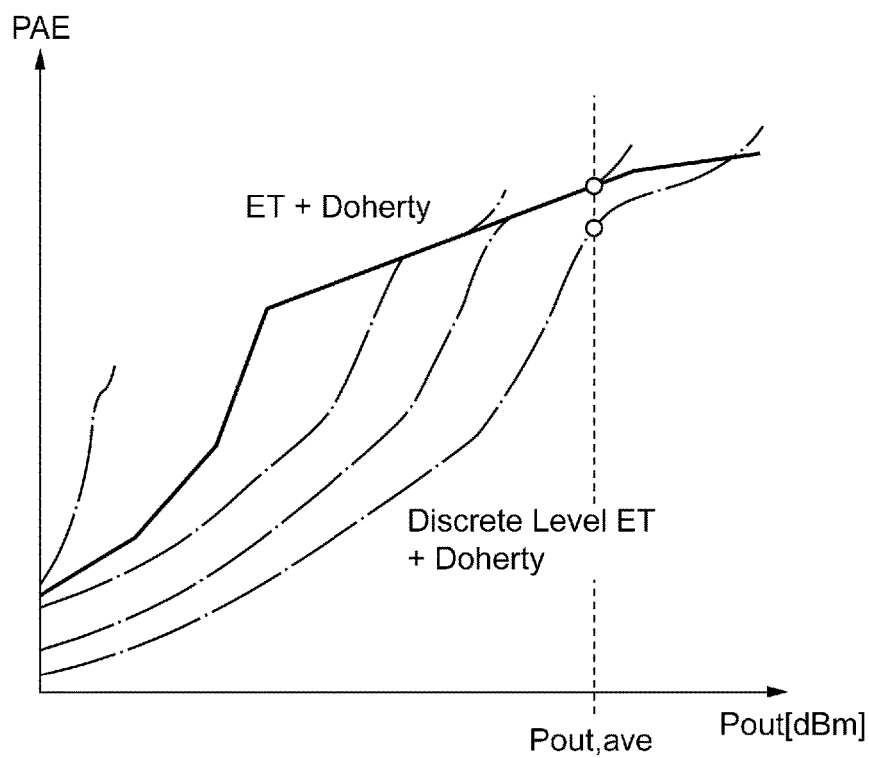
FIG. 10B is a conceptual drawing illustrating the relationship between the output power and the power efficiency for a case where the power supply voltage generation method is an ET method or a discrete level ET method and the power amplification method is a Doherty operation.

FIG. 10A is a conceptual drawing illustrating the relationship between the output power and the power efficiency for a case where the power supply voltage generation method is the ET method or the discrete level ET method and the power amplification method is the normal amplification operation. FIG. 10B is a conceptual drawing illustrating the relationship between the output power and the power efficiency for a case where the power supply voltage generation method is the ET method or the discrete level ET method and the power amplification method is the Doherty operation. In the graphs illustrated in FIGS. 10A and 10B, the power efficiencies obtained when the power supply voltage is changed to five different values are illustrated.

When the power supply voltage is generated using the discrete level ET method, the power efficiency is improved in the case of the Doherty operation compared with the case of the normal amplification operation. For example, if we compare the power efficiencies at an average output power ave, when the Doherty operation is used in combination with the discrete level ET method, the power efficiencies reach almost the same level as in the case of the ET method for each power supply voltage (refer to FIG. 10B). On the other hand, when the power supply voltage is generated using the ET method, a comparatively high efficiency is reached even in the case of the normal amplification operation (refer to FIG. 10A). Therefore, as is clear from comparing FIGS. 10A and 10B, the effect of combining the ET method and the Doherty operation is small compared with the effect of combining the Doherty operation and the discrete level ET method. As described above, it is preferable to combine the Doherty operation with the discrete level ET method and to combine the normal amplification operation with the ET method.

Figure 11:
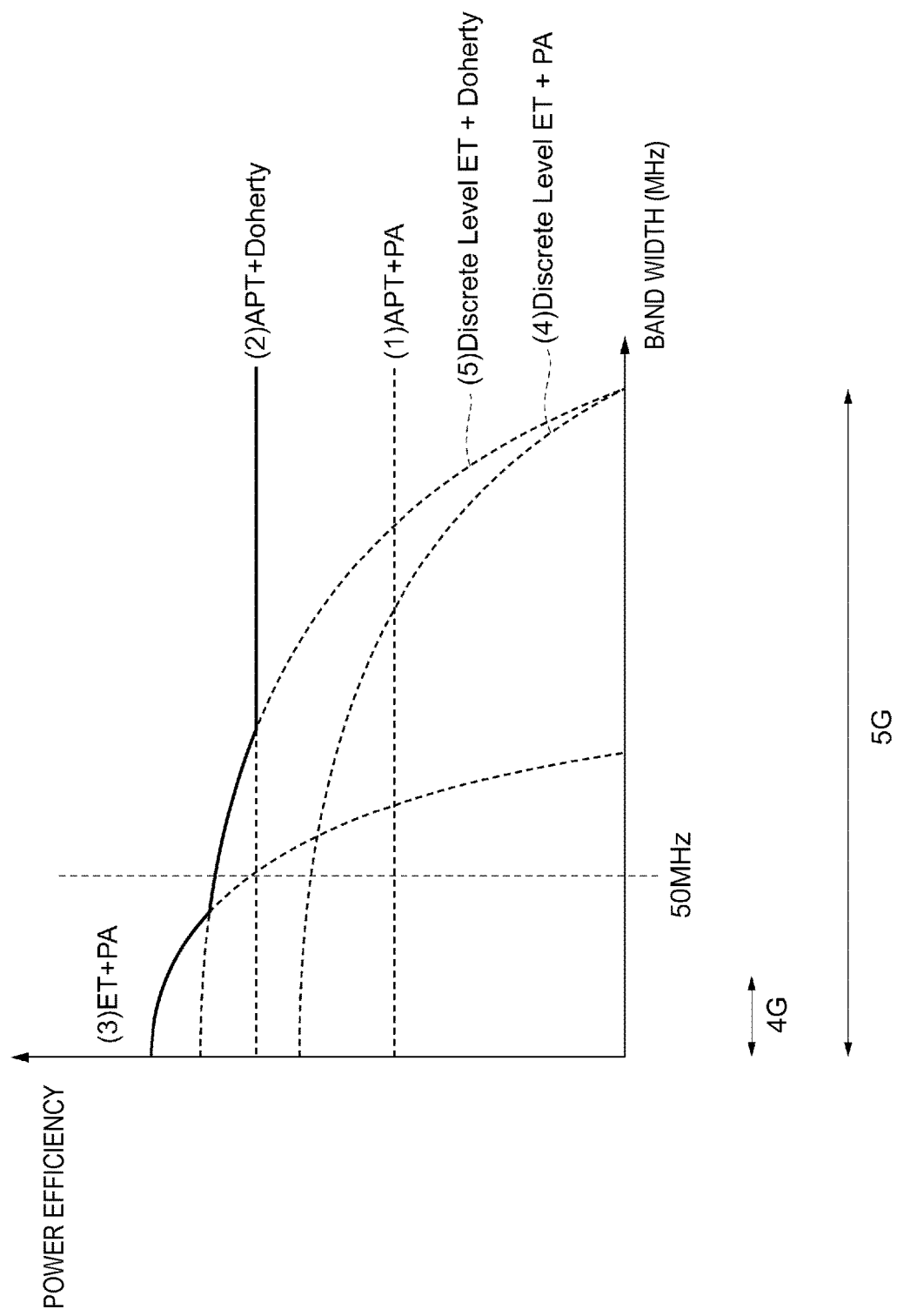
FIG. 11 is a conceptual drawing illustrating the relationship between the band width and the power efficiency for an operation pattern that can be realized by the transmission unit according to the second embodiment.

FIG. 11 is a conceptual drawing illustrating the relationship between the band width and the power efficiency for an operation pattern A that can be realized by the transmission unit 100B. The "operation pattern A" refers to the combination of methods illustrated in Table 3 below.

TABLE 3

|  | SMALL BAND WIDTH | MEDIUM BAND WIDTH | LARGE BAND WIDTH |
|---|---|---|---|
| POWER SUPPLY VOLTAGE GENERATION METHOD | ET | DISCRETE LEVEL ET | APT |
| POWER AMPLIFICATION METHOD | NORMAL AMPLIFICATION OPERATION | DOHERTY OPERATION | DOHERTY OPERATION |

The operation pattern A is a pattern in which a combination of the ET method and the normal amplification operation is used in the case of a first band width that is comparatively small, a combination of the APT method and the Doherty operation is used in the case of a second band width that is comparatively large, and a combination of the discrete level ET method and the Doherty operation is used in the case of a third band width that is larger than the first band width but smaller than the second band width. In the operation pattern A, the power supply module 130C needs the boost switching amplifier 200 and the multilevel buck switching amplifier 202 and the power amplification module 140A needs to have a Doherty amplifier configuration, and the operation pattern A has an advantage in that high efficiency can be realized for all the band widths compared with operation pattern B and operation pattern C described later.

Figure 12:
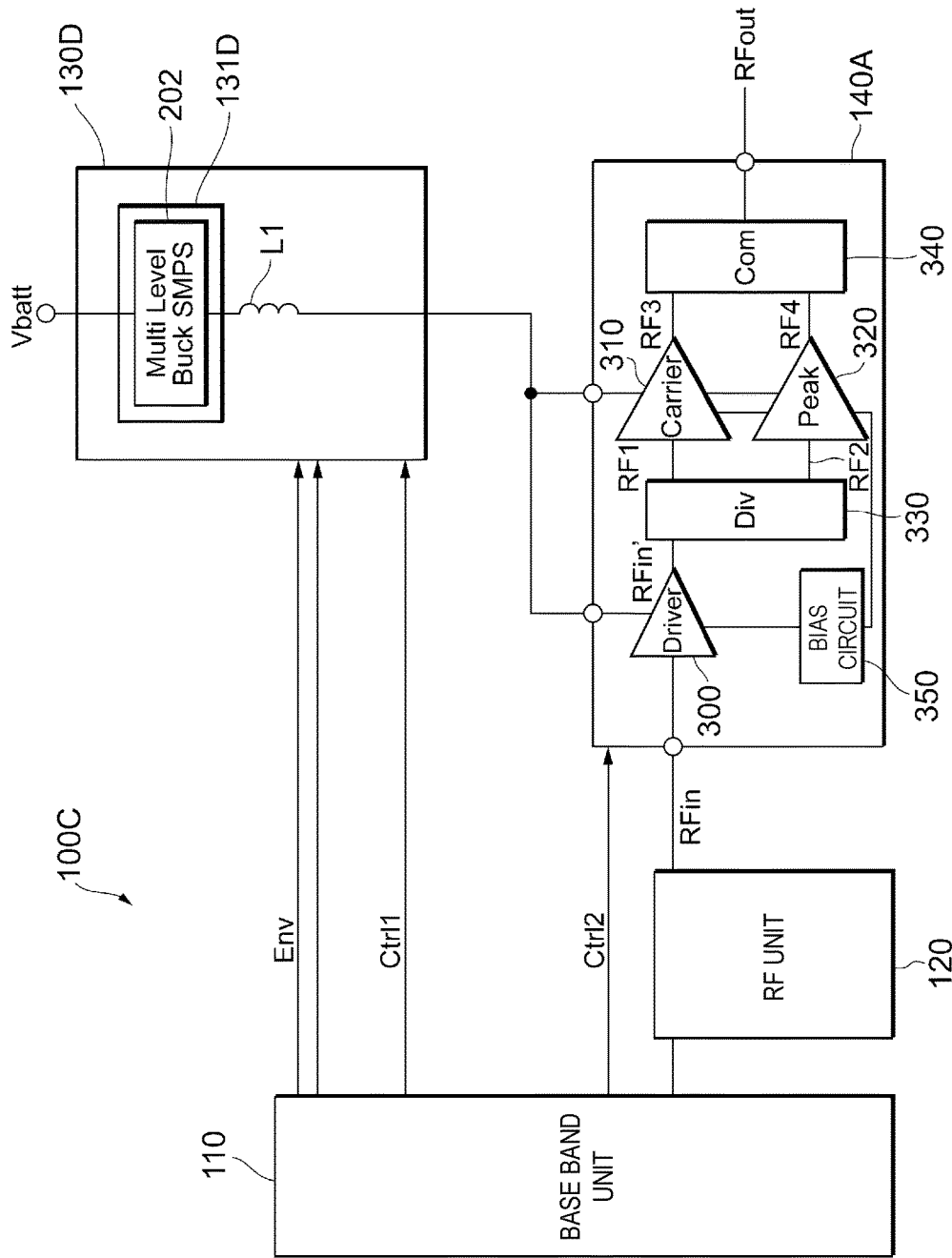
FIG. 12 is a diagram illustrating the circuit configuration of a transmission unit according to a third embodiment of the present disclosure.

FIG. 12 is a diagram illustrating the circuit configuration of a transmission unit 100C according to a third embodiment of the present disclosure.

As illustrated in FIG. 12, compared with the transmission unit 100B, the transmission unit 100C includes a power supply module 130D instead of the power supply module 130C. Compared with the power supply module 130C, the power supply module 130D has a configuration that does not include the boost switching amplifier 200, the differential amplifier 210, and the linear amplifier 220. In other words, the power supply module 130D has a configuration that can be used in the case where the power supply module 130D does not operate in accordance with the ET method. In addition, the multilevel buck switching amplifier 202 is formed on a power supply chip IC 131D, for example.

Figure 13:
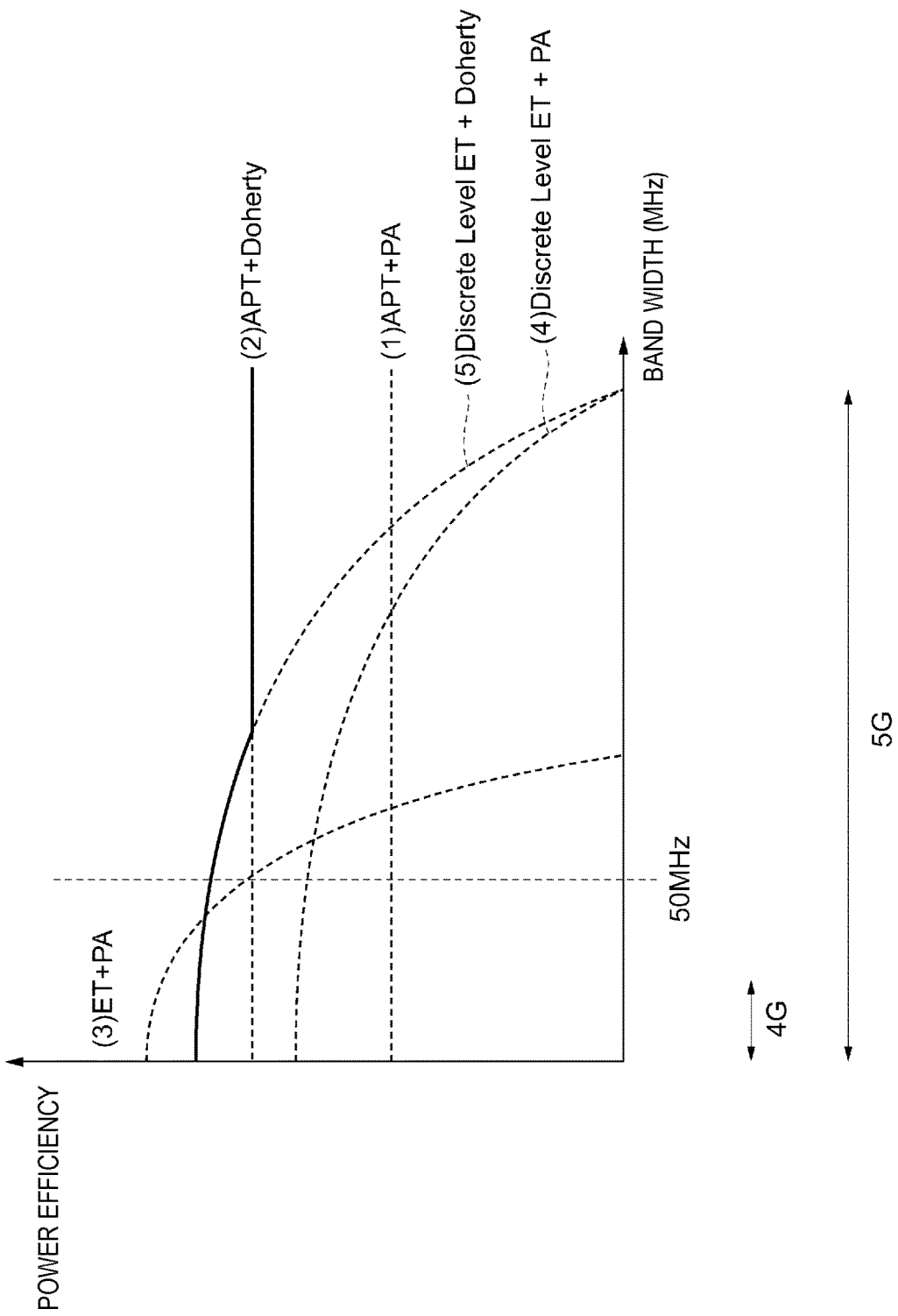
FIG. 13 is a conceptual drawing illustrating the relationship between the band width and the power efficiency for an operation pattern that can be realized by the transmission unit according to the third embodiment.

FIG. 13 is a conceptual drawing illustrating the relationship between the band width and the power efficiency for an operation pattern B that can be realized by the transmission unit 100C. The "operation pattern B" refers to the combination of methods illustrated in Table 4 below.

TABLE 4

| | SMALL BAND WIDTH | MEDIUM BAND WIDTH | LARGE BAND WIDTH |
|---|---|---|---|
| POWER SUPPLY VOLTAGE GENERATION METHOD | DISCRETE LEVEL ET | DISCRETE LEVEL ET | APT |
| POWER AMPLIFICATION METHOD | DOHERTY OPERATION | DOHERTY OPERATION | DOHERTY OPERATION |

The operation pattern B is a pattern in which a combination of the discrete level ET method and the Doherty operation is used in the case of a comparatively small band width and in the case of a medium band width and a combination of the APT method and the Doherty operation is used in the case of a comparatively large band width. Here, the comparatively small band width and the medium band width correspond to the first band width and the comparatively large band width corresponds to the second band width. Although the power efficiency is slightly degraded in the region where the band width is comparatively small in the operation pattern B compared with the operation pattern A described above, there is an advantage in that the power supply module 130D does not need to include the boost switching amplifier 200 and so on.

Figure 14:
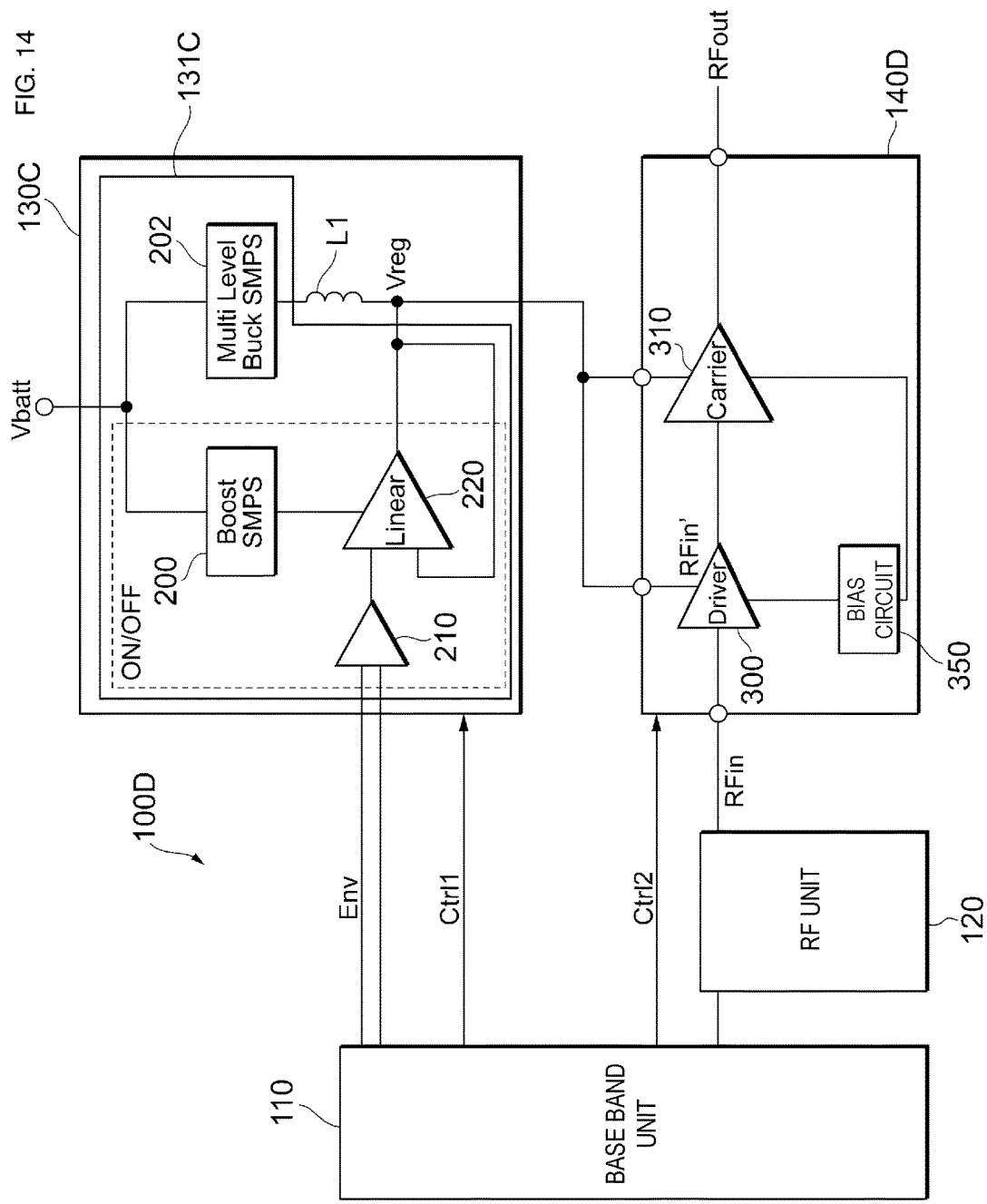
FIG. 14 is a diagram illustrating the circuit configuration of a transmission unit according to a fourth embodiment of the present disclosure.

FIG. 14 is a diagram illustrating the circuit configuration of a transmission unit 100D according to a fourth embodiment of the present disclosure.

As illustrated in FIG. 14, compared with the transmission unit 100B, the transmission unit 100D includes a power amplification module 140D instead of the power amplification module 140A. Compared with the power amplification module 140A, the power amplification module 140D has a configuration that does not include the peak amplifier 320, the divider 330, and the combiner 340. In other words, the power amplification module 140D has a configuration that can be used in the case where a normal amplification operation is performed without the Doherty operation. Specifically, in the power amplification module 140D, the driver amplifier 300 amplifies an RF signal RFin and outputs an RF signal RFin'. The carrier amplifier 310 amplifies the RF signal RFin' and outputs an amplified signal RFout.

Figure 15:
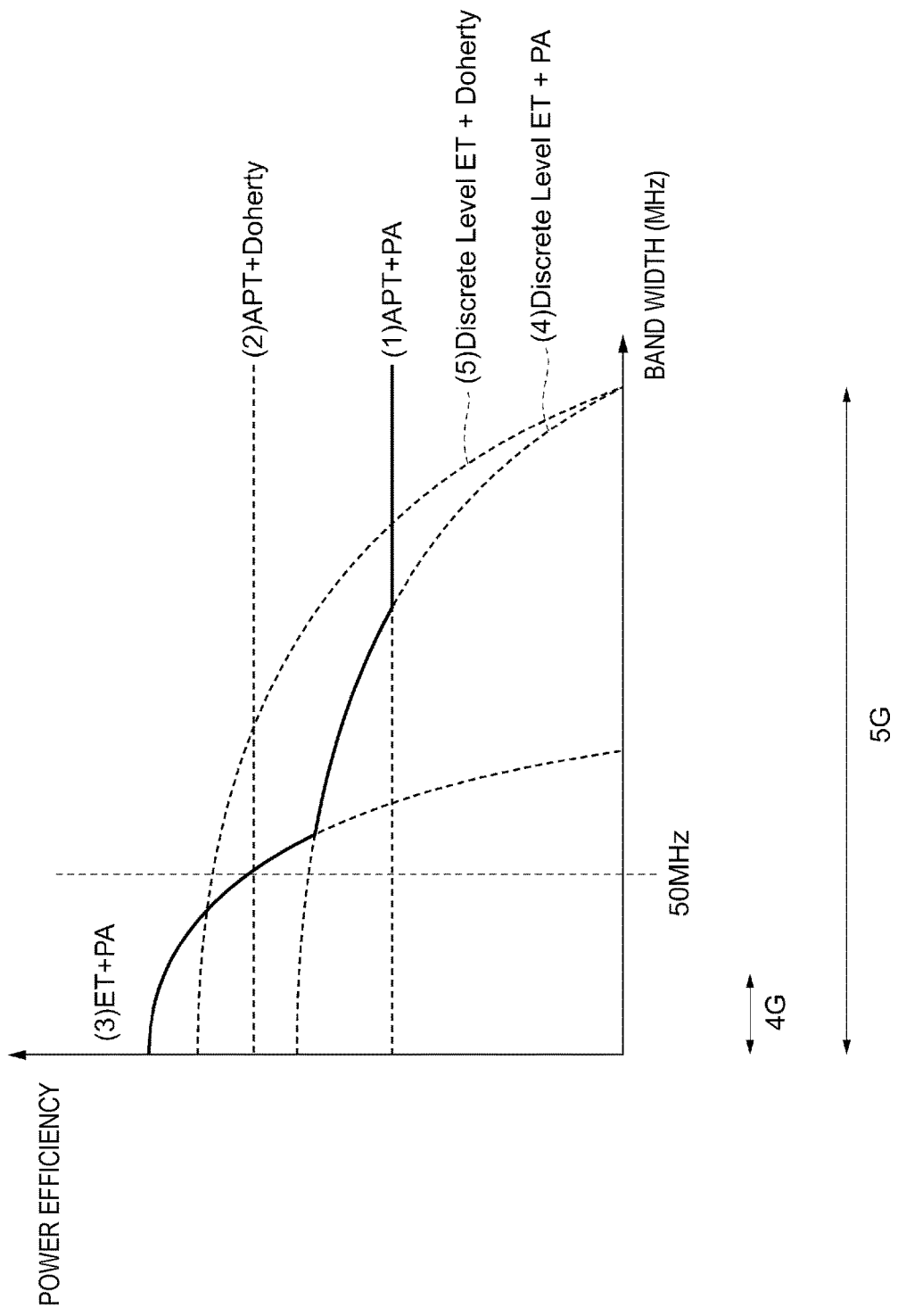
FIG. 15 is a conceptual drawing illustrating the relationship between the band width and the power efficiency for an operation pattern that can be realized by the transmission unit according to the fourth embodiment.

FIG. 15 is a conceptual drawing illustrating the relationship between the band width and the power efficiency for an operation pattern C that can be realized by the transmission unit 100D. The "operation pattern C" refers to the combination of methods illustrated in Table 5 below.

small band width and the medium band width correspond to the first band width and the comparatively large band width corresponds to the second band width. Although the power efficiency is slightly degraded when the band width is comparatively large in the operation pattern C compared with the operation pattern A described above, there is an advantage in that the power amplification module 140D does not need to include a Doherty amplifier configuration.

As described above, in the transmission units 100B to 100D, the power can be amplified with high power efficiency irrespective of the band width by appropriately changing the combination of the power supply voltage generation method and the power amplification method in accordance with the band width of the RF signal RFin. The combinations of the power supply voltage generation methods and the power amplification methods given in the above-described embodiments are merely examples, and the combinations are not limited to these examples. In addition, the combinations of the power supply modules 130A to 130D and the power amplification modules 140A to 140D are not limited to the combinations described above.

For example, the above-described power amplification modules 140A to 140C include the configuration of a Doherty amplifier, but in the case where the transmission module will not perform a Doherty operation, the configuration of the power amplification module 140D, which does not include the configuration of a Doherty amplifier, may be used.

In addition, in the above-described embodiments, an example is described in which the base band unit 110 outputs the control signals Ctrl1 and Ctrl2 and the envelope signal Env, but alternatively the RF unit 120 may detect the amplitude level of the modulated signal and output the control signals Ctrl1 and Ctrl 2 and the envelope signal Env instead of the base band unit 110.

Exemplary embodiments of the present disclosure have been described above. The transmission units 100 and 100A

TABLE 5

| | SMALL BAND WIDTH | MEDIUM BAND WIDTH | LARGE BAND WIDTH |
|---|---|---|---|
| POWER SUPPLY VOLTAGE GENERATION METHOD | ET | DISCRETE LEVEL ET | APT |
| POWER AMPLIFICATION METHOD | NORMAL AMPLIFICATION OPERATION | NORMAL AMPLIFICATION OPERATION | NORMAL AMPLIFICATION OPERATION |

The operation pattern C is a pattern in which a combination of the ET method and the normal amplification operation is used in the case of a comparatively small band width, a combination of the discrete level ET method and the normal amplification operation is used in the case of a medium band width, and a combination of the APT method and the normal amplification operation is used in the case of a comparatively large band width. Here, the comparatively to 100D each include a power amplification module that amplifies the power of an input signal (RF signal RFin') and outputs an amplified signal RFout and respectively include power supply modules 130 and 130A to 130D that supply a power supply voltage to the power amplification module on the basis of a first control signal corresponding to the band width of the input signal. On the basis of the first control signal, the power supply modules 130 and 130A to 130D cause the power supply voltage to vary in accordance with the amplitude level of the input signal in the case where the band width of the input signal is a first band width and cause the power supply voltage to vary in accordance with the average output power of the power amplification module in the case where the band width of the input signal is a second band width that is larger than the first band width. Consequently, in the transmission units 100 and 100A to 100D, the ET method is used in the case where the band width of the RF signal is comparatively small and the APT method is used in the case where the band width of the RF signal is comparatively large. Thus, for example, compared with a configuration in which the ET method is always used, the power efficiency can be improved irrespective of the size of the band width.

In addition, the power amplification modules 140A to 140C each include the divider 330 that divides an input signal into the RF signal RF1 and the RF signal RF2, the carrier amplifier 310 that amplifies the RF signal RF1 and outputs the RF signal RF3, the peak amplifier 320 that amplifies the RF signal RF2 and outputs the RF signal RF4, the combiner 340 that combines the RF signal RF3 and the RF signal RF4 and outputs the amplified signal RFout, and the bias circuit 350 that supplies a bias current or bias voltage to the carrier amplifier 310 and the peak amplifier 320. The bias circuit 350 adjusts the bias current or bias voltage on the basis of the second control signal such that the carrier amplifier 310 performs a class-A operation or a class-AB operation and the peak amplifier 320 performs a class-C operation in the case where the band width of the input signal is the second band width. Thus, in the transmission units 100A to 100C, the power amplification modules 140A to 140C perform a Doherty operation in the case of a large band width. Therefore, compared with a configuration where the normal amplification operation is performed irrespective of the band width, the power efficiency can be further improved.

In addition, in the power amplification modules 140A to 140C, the bias circuit 350 may adjust the bias current or bias voltage on the basis of the second control signal such that the carrier amplifier 310 and the peak amplifier 320 operate at identical operation points in the case where the band width of the input signal is the first band width. Consequently, both the normal amplification operation and the Doherty operation can be performed by a single power amplification module 140A, 140B, or 140C. Therefore, an increase in circuit area can be suppressed compared with a configuration in which different power amplification modules are provided for the respective power amplification methods. In addition, the carrier amplifier 310 and the peak amplifier 320 are both in an operating state at the time of the normal amplification operation. Therefore, a saturation output power having the same level as at the time of the Doherty operation can be obtained at the time of the normal amplification operation.

Furthermore, in the power amplification modules 140A to 140C, the bias circuit 350 may adjust the bias current or bias voltage on the basis of the second control signal such that the peak amplifier 320 is in an off state in the case where the band width of the input signal is the first band width.

In addition, the combiner 340A includes the combining part 410 that combines the RF signal RF3 and the RF signal RF4 and the ¼ wavelength line 400 that is serially connected between the output of the carrier amplifier 310 and the combining part 410. As a result, in the case where the phase of the RF signal RF1 is advanced by around 90° from the phase of the RF signal RF2 in the divider 330, the phase difference between the RF signal RF3 and the RF signal RF4 becomes around 0° and the signals are combined with each other in the combining part 410.

In addition, the combiner 340B includes the combining part 410 that combines the RF signal RF3 and the RF signal RF4, the inductor L2 that is serially connected between the output of the carrier amplifier 310 and the combining part 410, and the capacitor C1 that is serially connected between the peak amplifier 320 and the combining part 410. The inductor L2 retards the phase of the RF signal RF3 by around 45° and the capacitor C1 advances the phase of the RF signal RF4 by around 45°. As a result, in the case where the phase of the RF signal RF1 is advanced by around 45° and the phase of the RF signal RF2 is retarded by around 45° in the divider 330, the phase difference between the RF signal RF3 and the RF signal RF4 becomes around 0° and the signals are combined with each other in the combining part 410.

Furthermore, the power supply module 130B includes the buck switching amplifier 201 that steps up or steps down the power supply voltage Vbatt, the linear amplifier 220 that outputs the voltage Vreg corresponding to the amplitude level of the input signal, the capacitor C2 having one end connected to the output of the buck switching amplifier 201 and another end connected to the output of the linear amplifier 220, and the switch circuit SW1 that connects the other end of the capacitor C2 to ground in the case where the band width of the input signal is the second band width. Thus, both a coupling function and a decoupling function can be realized by a single capacitor C2.

In addition, on the basis of the first control signal, the power supply module 130C may continuously vary the power supply voltage in conjunction with variations in the amplitude level of the input signal in the case where the band width of the input signal is the first band width and may discretely vary the power supply voltage in conjunction with variations in the amplitude level of the input signal in the case where the band width of the input signal is the third band width, which is larger than the first band width and smaller than the second band width. Thus, the power efficiency can be further improved at the third band width compared with the transmission unit 100A.

Furthermore, in the transmission unit 100B, on the basis of the second control signal, the bias circuit 350 may adjust the bias current or bias voltage such that the carrier amplifier performs a class-A operation or a class-AB operation and the peak amplifier performs a class-C operation in the case where the band width of the input signal is the second band width and in the case where the band width of the input signal is the third band width. Thus, the power efficiency at the second band width and the third band width can be improved compared with the case where the normal amplification operation is performed.

Furthermore, on the basis of the first control signal, the power supply module 130D may discretely vary the power supply voltage in conjunction with the variations in the amplitude level of the input signal in the case where the band width of the input signal is the first band width. Thus, a power supply voltage can be generated in accordance with the discrete level ET method for the first band width.

Furthermore, in the transmission unit 100C, on the basis of the second control signal, the bias circuit 350 may adjust the bias current or bias voltage such that the carrier amplifier performs a class-A operation or a class-AB operation and the peak amplifier performs a class-C operation in the case where the band width of the input signal is the first band width and in the case where the band width of the input signal is the second band width. Thus, the power efficiency at the first band width and the second band width can be improved compared with the case where the normal amplification operation is performed.

The purpose of the embodiments described above is to enable easy understanding of the present disclosure and the embodiments are not to be interpreted as limiting the present disclosure. The present disclosure can be changed or improved without departing from the gist of the disclosure and equivalents to the present disclosure are also included in the present disclosure. In other words, appropriate design changes made to the embodiments by one skilled in the art are included in the scope of the present disclosure so long as the design changes have the characteristics of the present disclosure. For example, the elements included in the embodiments and the arrangements, materials, conditions, shapes, sizes and so forth of the elements are not limited to those exemplified in the embodiments and can be appropriately changed. In addition, the elements included in the embodiments can be combined as much as technically possible and such combined elements are also included in the scope of the present disclosure so long as the combined elements have the characteristics of the present disclosure.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A transmission unit comprising:
    a power amplification circuit configured to amplify a power of an input signal and to output an amplified signal; and
    a power supply circuit configured to supply a power supply voltage to the power amplification circuit based on a first control signal that corresponds to a band width of the input signal,
    wherein the power supply circuit is configured to:
        vary the power supply voltage in accordance with an amplitude level of the input signal when the band width of the input signal is a first band width, and
        vary the power supply voltage in accordance with an average output power of the power amplification circuit when the band width of the input signal is a second band width,
    wherein the second band width is larger than the first band width.

2. The transmission unit according to claim 1, wherein the power amplification circuit comprises:
    a divider configured to divide the input signal into a first signal and a second signal,
    a carrier amplifier configured to amplify the first signal and to output a third signal,
    a peak amplifier configured to amplify the second signal and to output a fourth signal,
    a combiner configured to combine the third signal and the fourth signal, and to output the amplified signal, and
    a bias circuit configured to supply a bias current or a bias voltage to the carrier amplifier and to the peak amplifier based on a second control signal corresponding to the band width of the input signal, and
    wherein when the band width of the input signal is the second band width, the bias circuit is configured to adjust, based on the second control signal, the bias current or the bias voltage such that the carrier amplifier performs a class-A operation or a class-AB operation and the peak amplifier performs a class-C operation.

3. The transmission unit according to claim 2, wherein the power supply circuit comprises:
    a switching amplifier configured to step up or step down a prescribed voltage,
    a linear amplifier configured to output the power supply voltage in accordance with the amplitude level of the input signal,
    a second capacitor that has a first end connected to an output of the switching amplifier and a second end connected to an output of the linear amplifier, and
    a switch circuit configured to connect the second end of the second capacitor to ground when the band width of the input signal is the second band width.

4. The transmission unit according to claim 2, wherein when the band width of the input signal is the first band width, the bias circuit is configured to adjust, based on the second control signal, the bias current or the bias voltage such that the peak amplifier is in an off state.

5. The transmission unit according to claim 4, wherein the combiner comprises:
    a combining circuit that electrically connects an output of the carrier amplifier and an output of the peak amplifier at a node such that the third signal and the fourth signal are combined at the node,
    an inductor that is serially connected between the output of the carrier amplifier and the node, and
    a first capacitor that is serially connected between the output of the peak amplifier and the node, and
    wherein the inductor delays a phase of the third signal by around 45° and advances a phase of the fourth signal by around 45°.

6. The transmission unit according to claim 4, wherein the power supply circuit comprises:
    a switching amplifier configured to step up or step down a prescribed voltage,
    a linear amplifier configured to output the power supply voltage in accordance with the amplitude level of the input signal,
    a second capacitor that has a first end connected to an output of the switching amplifier and a second end connected to an output of the linear amplifier, and
    a switch circuit configured to connect the second end of the second capacitor to ground when the band width of the input signal is the second band width.

7. The transmission unit according to claim 2, wherein the combiner comprises:
    a combining circuit that electrically connects an output of the carrier amplifier and an output of the peak amplifier at a node such that the the third signal and the fourth signal are combined at the node, and
    a ¼ wavelength line that is serially connected between the output of the carrier amplifier and the node.

8. The transmission unit according to claim 7, wherein the power supply circuit comprises:
    a switching amplifier configured to step up or step down a prescribed voltage,
    a linear amplifier configured to output the power supply voltage in accordance with the amplitude level of the input signal,
    a second capacitor that has a first end connected to an output of the switching amplifier and a second end connected to an output of the linear amplifier, and a switch circuit configured to connect the second end of the second capacitor to ground when the band width of the input signal is the second band width.

9. The transmission unit according to claim 2, wherein the combiner comprises:
a combining circuit that electrically connects an output of the carrier amplifier and an output of the peak amplifier at a node such that the third signal and the fourth signal are combined at the node,
an inductor that is serially connected between the output of the carrier amplifier and the node, and
a first capacitor that is serially connected between the output of the peak amplifier and the node, and
wherein the inductor delays a phase of the third signal by around 45° and advances a phase of the fourth signal by around 45°.

10. The transmission unit according to claim 9, wherein the power supply circuit comprises:
a switching amplifier configured to step up or step down a prescribed voltage,
a linear amplifier configured to output the power supply voltage in accordance with the amplitude level of the input signal,
a second capacitor that has a first end connected to an output of the switching amplifier and a second end connected to an output of the linear amplifier, and
a switch circuit configured to connect the second end of the second capacitor to ground when the band width of the input signal is the second band width.

11. The transmission unit according to claim 2, wherein when the band width of the input signal is the first band width, the bias circuit is configured to adjust, based on the second control signal, the bias current or the bias voltage such that the carrier amplifier and the peak amplifier operate at the same operation points.

12. The transmission unit according to claim 11, wherein the combiner comprises:
a combining circuit that electrically connects an output of the carrier amplifier and an output of the peak amplifier at a node such that the the third signal and the fourth signal are combined at the node, and
a ¼ wavelength line that is serially connected between the output of the carrier amplifier and the node.

13. The transmission unit according to claim 11, wherein the combiner comprises:
a combining circuit that electrically connects an output of the carrier amplifier and an output of the peak amplifier at a node such that the the third signal and the fourth signal are combined at the node, and
a ¼ wavelength line that is serially connected between the output of the carrier amplifier and the node.

14. The transmission unit according to claim 11, wherein the combiner comprises:
a combining circuit that electrically connects an output of the carrier amplifier and an output of the peak amplifier at a node such that the third signal and the fourth signal are combined at the node,
an inductor that is serially connected between the output of the carrier amplifier and the node, and
a first capacitor that is serially connected between the output of the peak amplifier and the node, and
wherein the inductor delays a phase of the third signal by around 45° and advances a phase of the fourth signal by around 45°.

15. The transmission unit according to claim 11, wherein the power supply circuit comprises:
a switching amplifier configured to step up or step down a prescribed voltage,
a linear amplifier configured to output the power supply voltage in accordance with the amplitude level of the input signal,
a second capacitor that has a first end connected to an output of the switching amplifier and a second end connected to an output of the linear amplifier, and
a switch circuit configured to connect the second end of the second capacitor to ground when the band width of the input signal is the second band width.

16. The transmission unit according to claim 1, wherein the power supply circuit comprises:
a switching amplifier configured to step up or step down a prescribed voltage,
a linear amplifier configured to output the power supply voltage in accordance with the amplitude level of the input signal,
a second capacitor that has a first end connected to an output of the switching amplifier and a second end connected to an output of the linear amplifier, and
a switch circuit configured to connect the second end of the second capacitor to ground when the band width of the input signal is the second band width.

17. The transmission unit according to claim 1, wherein based on the first control signal, the power supply circuit is configured to:
continuously vary the power supply voltage in conjunction with variations in the amplitude level of the input signal when the band width of the input signal is the first band width, and
discretely vary the power supply voltage in conjunction with variations in the amplitude level of the input signal when the band width of the input signal is a third band width,
wherein the third band width is larger than the first band width and smaller than the second band width.

18. The transmission unit according to claim 17, wherein the power amplification circuit comprises:
a divider configured to divide the input signal into a first signal and a second signal,
a carrier amplifier configured to amplify the first signal and to output a third signal,
a peak amplifier configured to amplify the second signal and to output a fourth signal,
a combiner configured to combine the third signal and the fourth signal and to output the amplified signal, and
a bias circuit configured to supply a bias current or a bias voltage to the carrier amplifier and the peak amplifier based on a second control signal corresponding to the band width of the input signal, and
wherein when the band width of the input signal is the second band width or the third band width, the bias circuit is configured to adjust, based on the second control signal, the bias current or the bias voltage such that the carrier amplifier performs a class-A operation or a class-AB operation and the peak amplifier performs a class-C operation.

19. The transmission unit according to claim 1, wherein when the band width of the input signal is the first band width, the power supply circuit is configured to, based on the first control signal, discretely vary the power supply voltage in conjunction with variations in the amplitude level of the input signal.

20. The transmission unit according to claim 19, wherein the power amplification circuit comprises:

a divider configured to divide the input signal into a first signal and a second signal, a carrier amplifier configured to amplify the first signal and to output a third signal, a peak amplifier configured to amplify the second signal and to output a fourth signal, a combiner configured to combine the third signal and the fourth signal and to output the amplified signal, and a bias circuit configured to supply a bias current or a bias voltage to the carrier amplifier and the peak amplifier based on a second control signal corresponding to the band width of the input signal, and wherein when the band width of the input signal is the first band width or the second band width, the bias circuit is configured to adjust, based on the second control signal, the bias current or the bias voltage such that the carrier amplifier performs a class-A operation or a class-AB operation and the peak amplifier performs a class-C operation.

* * * * *